United States Patent [19]
Ogawa

[11] Patent Number: 5,731,519
[45] Date of Patent: Mar. 24, 1998

[54] OSCILLATION GYRO AND AN INSPECTION APPARATUS THEREFOR

[75] Inventor: Kenji Ogawa, Himeji, Japan

[73] Assignee: Mitsubishi Denki Kabushiki Kaisha, Tokyo, Japan

[21] Appl. No.: 695,435

[22] Filed: Aug. 12, 1996

Related U.S. Application Data

[62] Division of Ser. No. 352,032, Nov. 30, 1994, Pat. No. 5,600,063.

[30] Foreign Application Priority Data

Aug. 24, 1994 [JP] Japan ................... 6-199607

[51] Int. Cl.$^6$ .................... G01C 19/00; G01P 9/00
[52] U.S. Cl. ........................... 73/504.12; 310/316
[58] Field of Search .................... 73/504.02, 504.03, 73/504.12, 504.13, 504.14; 310/316, 317

[56] References Cited

U.S. PATENT DOCUMENTS

| | | | |
|---|---|---|---|
| 4,671,112 | 6/1987 | Kimura et al. | 73/504.16 |
| 4,791,815 | 12/1988 | Yamaguchi et al. | 73/505 |
| 5,117,148 | 5/1992 | Nakamura et al. | 310/367 |
| 5,131,273 | 7/1992 | Tabata et al. | 73/505 |
| 5,220,833 | 6/1993 | Nakamura | 73/505 |
| 5,375,336 | 12/1994 | Nakamura | 33/324 |
| 5,412,204 | 5/1995 | Nakamura | 250/231.12 |
| 5,434,467 | 7/1995 | Abe et al. | 310/366 |
| 5,444,639 | 8/1995 | White | 364/572 |
| 5,520,050 | 5/1996 | Nakamura | 73/504.14 |

FOREIGN PATENT DOCUMENTS

| | | |
|---|---|---|
| 0584798 | 3/1994 | European Pat. Off. . |
| 0642216 | 3/1995 | European Pat. Off. . |
| 0645602 | 3/1995 | European Pat. Off. . |
| 223818 | 9/1990 | Japan . |
| 106410 | 4/1992 | Japan . |
| 28140 | of 1993 | Japan . |
| 2164749 | 3/1986 | United Kingdom . |
| 2251072 | 6/1992 | United Kingdom . |
| 2262343 | 6/1993 | United Kingdom . |

*Primary Examiner*—Hezron E. Williams
*Assistant Examiner*—Richard A. Moller
*Attorney, Agent, or Firm*—Sughrue, Mion, Zinn, Macpeak & Seas, PLLC

[57] ABSTRACT

A vibration gyro which comprises an oscillator; a plurality of piezoelectric units for oscillating the oscillator in a predetermined driving-axis direction; piezoelectric unit driving means for driving the plurality of piezoelectric units by supplying an electric power to a common electrode of the plurality of piezoelectric units; a plurality of current-voltage converting means each for converting a current outputted from each of noncommon electrodes of the plurality of piezoelectric units to a voltage; eliminating means for eliminating damping components of the plurality of piezoelectric units by amplifying an output of the piezoelectric unit driving means by a predetermined amplification factor, shifting a phase of an amplified signal by a predetermined angle, shunting the amplified signal, and supplying each of shunted signals to each of the plurality of current-voltage converting means; adding means for adding outputs of the plurality of current-voltage converting means and for feeding back an added value respectively to the plurality of the current-voltage converting means; and error calculating means for calculating a difference between the outputs of the plurality of current-voltage converting means.

4 Claims, 21 Drawing Sheets

EXAMPLE OF OUTPUT OF ADDED OUTPUTS INSPEC. MEANS

EXAMPLE OF OUTPUT OF DIFFERENTIAL OUTPUT INSPECTING MEANS

OSCILLATION GYRO AND AN INSPECTION APPARATUS THEREFOR

This is a divisional of application Ser. No. 08/352,032 filed Nov. 30, 1994, now U.S. Pat. No. 5,600,063.

BACKGROUND OF THE INVENTION

The present invention relates to an oscillation gyro which is mounted on an automobile or the like for detecting an angular velocity caused by steering or the like, and which is used for an attitude control system or a navigation system of a vehicle.

FIG. 25 is a construction diagram of an oscillation gyro which is described in Japanese Application No. 28140/1993 which has previously been filed by the inventor. In FIG. 25, numeral 1 designates an oscillator having a regular quadrangle shape, which is composed of a constant elasticity material of elinvar or the like. Numerals 2 and 3 designate piezoelectric units for driving the oscillator 1, which are fixed to two contiguous column faces of the oscillator 1 by using a conductive adhesive agent or the like. The oscillator 1 and the piezoelectric units 2 and 3 constitute an oscillating unit. Numerals 4 and 5 designate current-voltage converters as current-voltage converting means, which are respectively connected with noncommon electrodes of the piezoelectric units 2 and 3. Numeral 6 designates an adder for adding outputs of the current-voltage converters 4 and 5, and numeral 7 designates an amplifier for oscillating the oscillator 1 by a self-excited oscillation, by amplifying an output of the adder 6 and by feeding back the amplified signal to the oscillator 1 which also operates as a common electrode of the piezoelectric units 2 and 3, which functions as a piezoelectric unit driving means for driving the piezoelectric units 2 and 3. Further, at the output side of the adder 6, an amplitude detecting means 8 for detecting an amplitude of the output from the adder 6, and a controller 9 for controlling a gain of the amplifier 7 by receiving an output of the amplitude detecting means 8. The amplitude detector 8 and the controller 9 control the amplitude of the output of the adder 6 to be a predetermined value. An output of the amplifier 7 is also inputted to an inverting amplifier 7 having a gain of K, of which output is inputted to the current-voltage converters 4 and 5 through condensers 11a and 11b, each having a capacitance of Cr. The inverting amplifier 10 and the condensers 11a and 11b constitute an eliminating means for eliminating damping capacitances of the piezoelectric units, mentioned later, by amplifying the output of the amplifier 7, shifting the phase of the output by approximately 90°, and supplying the output to the current-voltage converters 4 and 5. Numeral 12 designates a differential amplifier as an error calculating means for calculating a difference between the outputs of the current-voltage converters 4 and 5, which outputs a signal corresponding to the angular velocity.

An explanation will be given of the operation of the conventional oscillation gyro shown in FIG. 25. A voltage V is supplied from the amplifier 7 to the oscillator 1 which operates as a common electrode of the piezoelectric units 2 and 3. On the other hand, the noncommon electrodes of the piezoelectric units 2 and 3 are connected to inverting input terminals of operational amplifiers 41 and 51 respectively composing the current-voltage converters. Further, the non-inverting input terminals of the operational amplifiers 41 and 51 are grounded. Accordingly, the noncommon terminals of the piezoelectric units 2 and 3 are respectively in an imaginarily-grounded state whereby the piezoelectric units 2 and 3 drive the oscillator 1 in a predetermined driving-axis direction by the voltage from the amplifier 7. Currents from the noncommon electrodes of the piezoelectric units 2 and 3 respectively flow into the inverting input terminals of the operational amplifiers 41 and 51, as shown. Further, currents from the condensers 11a and 11b also flow into the inverting terminals of the operational amplifiers 41 and 51. Therefore, the output voltages of the operational amplifiers 41 and 51 are determined by a current value added with each of the currents flowing in the piezoelectric units 2 and 3 and each of the currents flowing in the condensers 11a and 11b, respectively, and resistance values for respective feedback resistors 42 and 52.

An explanation will be given of the operation of the current-voltage converters 4 and 5 based on FIG. 26. As shown in FIG. 26, the piezoelectric unit 2 is expressed by an equivalent circuit composed of L(21), C(22), R(23) and Cd(24). A current I3 flowing through the condenser 11b is given by the following equation.

$$I3 = j\omega \times Cr \times K \times V \quad (1)$$

On the other hand, a current I2 flowing in the Cd(24) which is the damping capacitance of the piezoelectric unit 2 is given by the following equation.

$$I2 = j\omega \times Cd \times V \quad (2)$$

Under this state, when K=Cd/Cr, the I2 flowing into the inverting input terminal of the operational amplifier 41 is equal to the I3 flowing out of the inverting input terminal, and therefore, only a current I1 flowing in a series resonance circuit composed of L(21), C(22) and R(23) flows into the inverting input terminal. In this way, the current I1 is equal to a current I4 flowing in a resistor 42 connected to the operational amplifier 41, and therefore, the output of the operational amplifier 41 corresponds to the current flowing in the series resonance circuit.

Further, although the above explanation has been given of the piezoelectric unit 2 and the current-voltage converter 4, the same explanation is also applicable to the piezoelectric unit 3 and the current-voltage converter 5.

The outputs of the current-voltage converters 4 and 5 are signals corresponding to the series resonance components of the equivalent circuit of the piezoelectric units 2 and 3, and the series resonance components are determined by the mechanical resonance characteristic of the oscillator 1 and the force factor of the piezoelectric units. Further, the adder 6 receives the outputs of the current-voltage converters 4 and 5, and outputs the sum of both. Accordingly, the output of the adder 6 is also determined by the mechanical resonance characteristic of the oscillator 1 and the force factor of the piezoelectric units. When such a signal is fed back to the oscillator 1, the oscillator 1 is oscillated in a self-excited oscillation at a mechanical resonance point.

As stated above, the oscillation gyro of FIG. 25 oscillates the oscillator 1 in a self-excited oscillation by feeding back the signal which is determined by the mechanical resonance characteristic and the force factor of the piezoelectric units, and detects the angular velocity by detecting a difference between the currents flowing in the series resonance components in the equivalent circuit of the piezoelectric units 2 and 3 and by amplifying it.

Next, an explanation will be given of the principle of detecting the angular velocity by a vibration gyro.

FIG. 27a is a symbolic expression of the piezoelectric units 2 and 3, showing that, when the same potential V is applied on the two piezoelectric units, currents of IL and IR respectively flow therein. As shown in FIG. 27b, when the voltage V is applied on the piezoelectric units 2 and 3, the piezoelectric units 2 and 3 generate FL (a force by the piezoelectric unit 2) and FR (a force by the piezoelectric unit 3) in the orthogonal directions of the piezoelectric units. These forces FL and FR are expressed by the following equations by using unit vectors i and j in the detecting-axis direction (transverse direction) and in the driving-axis direction (longitudinal direction). A in the following equations indicates the force factor of the piezoelectric unit.

$$FL = A \times V \times \cos 45° \times i + A \times V \times \sin 45° \times j \quad (3)$$

$$FR = -A \times V \times \cos 45° \times i + A \times V \times \sin 45° \times j \quad (4)$$

By synthesizing these two forces FL and FR, the oscillator 1 receives a force only in the driving-axis direction, and moves in the driving-axis direction at a velocity of vY.

Under this state, the oscillator 1 is applied with an angular velocity $\Omega$ by steering of a vehicle or the like as shown in FIG. 27c. At this moment, a Coriolis force FC is generated in the oscillator 1 in the detecting-axis direction. The size of FC is given by the following equation by defining an equivalent mass of the oscillator 1 as m.

$$FC = 2 \times m \times \Omega \times vY \times i \quad (5)$$

The oscillator 1 oscillates in the detecting-axis direction and the driving-axis direction respectively with velocities of vX and vY by the forces FL and FR which are generated by the piezoelectric units 2 and 3 and the Coriolis force FC, and a reactive force FZ is generated. The size of the reactive force is given by the following equation by defining a mechanical impedance in the detecting-axis direction as ZX, a mechanical impedance in the driving-axis direction as ZY.

$$FZ = -ZX \times vX \times i - ZY \times vY \times j \quad (6)$$

The following equation is established since the forces FL and FR generated by the piezoelectric units 2 and 3, the Coriolis force FC and the reactive force FZ are balanced.

$$0 = FL + FR + FC + FZ \quad (7)$$

Therefore, the following equations are obtained by substituting the equations (3) through (6) to the equation (7), and by separating it with respect to the "i" term (in the detecting-axis direction) and the "j" term (in the driving-axis direction).

In the detecting-axis direction:

$$0 = 2 \times m \times \Omega \times vY - ZX \times vX \quad (8)$$

In the driving-axis direction:

$$0 = 2 \times A \times V \times \sin 45° - ZY \times vY \quad (9)$$

The angular velocity $\Omega$ is provided from these equations of (8) and (9), as follows.

$$\Omega = (ZX \times ZY \times vX)/(4 \times m \times A \times V \times \sin 45°) \quad (10)$$

On the other hand, the currents IL and IR flowing in the piezoelectric units 2 and 3 are expressed by the following equations by defining the damping admittance of the piezoelectric units 2 and 3 as Y, and defining the oscillation velocities in the respective orthogonal directions as VL and VR.

$$IL = A \times vL + Y \times V \quad (11)$$

$$IR = A \times vR + Y \times V \quad (12)$$

Further, VL, VR, vX and vY are in a relationship of FIG. 27d in view of a vector relationship.

Hence, $$VX = \cos 45° \times (vL - vR) \quad (13)$$

$$vY = \sin 45° \times (vL + vR) \quad (14)$$

At this point, the equation (11) is subtracted by the equation (12), and (vL−vR) is eliminated by the equation (13), as follows.

$$(IL - IR) = A \times (vL - vR) = A \times vX / \cos 45° \quad (15)$$

By using the equation (15), vX in the equation (10) is eliminated to provide the equation (16) as follows.

$$\Omega = \frac{ZX \times ZY \times \cos 45°}{4 \times m \times A^2 \times V \times \sin 45°} \times (IL - IR) \quad (16)$$

Further, the following equation is given by adding the equations (11) and (12).

$$(IL + IR) = A \times (vL + vR) + 2 \times Y \times V \quad (17)$$
$$= A \times vY/\sin 45° + 2 \times Y \times V$$

vY is eliminated by using the equation (9) in the equation (17), as follows.

$$(IL + IR - 2 \times Y \times V) = 2 \times A^2 \times V/ZY \quad (18)$$

By substituting the equation (18) to the equation (16), the following equation is provided.

$$(IL - IR) = \frac{2 \times m \times \sin 45°}{ZX \times \cos 45°} \times (IL + IR - 2 \times Y \times V) \times \Omega \quad (19)$$

According to the equation (19), the difference (IL−IR) of the currents flowing in the piezoelectric units 2 and 3 when the oscillator 1 is driven by applying the same potential on the piezoelectric units 2 and 3, is determined by the angular velocity $\Omega$. Therefore, the angular velocity $\Omega$ is known by detecting the difference of currents (IL−IR). Further, especially, by maintaining constant an amount (IL+IR−2× Y×V) which is the sum of currents subtracted by the respective damping admittance components, the gain of the difference of currents with respect to the angular velocity $\Omega$ is determined by the equivalent mass m and the mechanical impedance ZX in the detecting-axis direction of the oscillator 1.

At this stage, an explanation will be given of a corresponding relationship between the aforementioned equations and the circuit of FIG. 25.

When the same potential V is applied on the piezoelectric units 2 and 3, the currents IL and IR flow respectively therein. As explained above, the outputs of the current-voltage converters 4 and 5 are the currents which flow when the same potential V is applied on the piezoelectric units 2 and 3 respectively connecting to the current-voltage converters 4 and 5, subtracted by the damping capacitance components of the piezoelectric units through the amplifier 10 and the condensers 11a and 11b. In this relationship, Y designates an inverse number (admittance) of the damping capacitance Cd.

Accordingly, $$(\text{Current-voltage converter 4}): IL - Y \times V \quad (20)$$

$$(\text{Current-voltage converter 5}): IR - Y \times V \quad (21)$$

The subtraction is performed with respect to the outputs of the current-voltage converters 4 and 5 by the differential amplifier 12, and (IL−IR) is outputted from the differential amplifier 12. This is the angular velocity signal.

On the other hand, the outputs of the current-voltage converters 4 and 5 are added together by the adder 6, and the adder 6 outputs (IL+IR−2×Y×V). Further, the amplitude detecting means 8, the controller 9 and the amplifier 7 control the amplitude of the voltage V which is applied to the piezoelectric units 2 and 3 so that the amplitude of the output of the adder 6 becomes a predetermined value. Accordingly, (IL+IR−2×Y×V)=CONST (constant). The equation (19) is modified based on the above relationship, as follows.

$$(IL - IR) = \frac{2 \times m \times \sin 45°}{ZX \times \cos 45°} \times CONST \times \Omega \qquad (22)$$

In this way, the force factors of the piezoelectric units 2 and 3 are eliminated.

Further, the phase relationship between the voltage V applied on the piezoelectric units 2 and 3 and the output (IL+IR−2×Y×V) of the adder 6 is provided by the equation (18), as follows.

$$(IL+IR-2\times Y\times V)/V = 2\times A^2/ZY \qquad (23)$$

Accordingly, by feeding back the output of the adder 6 to the piezoelectric units 2 and 3 through the amplifier 7, the oscillator 1 is oscillated by a self-excited oscillation at the resonance point of the mechanical impedance ZY in the driving-axis direction. Therefore, the phase difference between the output of the adder 6 and the applied voltage V becomes 0°.

Further, the phase relationship between the output of the adder 6 and the output of the differential amplifier 12 is provided by modifying the equation (19), as follows.

$$\frac{IL-IR}{IL+IR-2\times Y\times V} = \frac{2\times m\times \cos 45°}{ZX \times \sin 45°} \qquad (24)$$

According to the equation (24), the phase relationship between the output of the adder 6 and the output of the differential amplifier 12 is determined by the phase of an inverse number 1/ZX of the mechanical impedance in the detecting-axis direction of the oscillator 1. The resonance frequency in the detecting-axis direction is deviated from the resonance frequency in the driving-axis direction, and normally the phase difference is 90°.

The currents flowing in the two piezoelectric units, are superposed with the current component caused by the angular velocity and the current component caused by driving the oscillator, respectively.

The conventional oscillation gyro takes out only the current component caused by the angular velocity by calculating the difference between the currents flowing in the two piezoelectric units, as stated above.

However, the current component caused by the angular velocity is significantly small compared with the current component caused by driving the oscillator. Therefore, the former component strongly receives the influence of a common-mode rejection ratio of the differential amplifier and its S/N ratio is poor. Further, when the common-mode detection ratio of the differential amplifier changes with a change in an environmental temperature (surrounding temperature), the output of the angular velocity is influenced thereby, and especially, an angular velocity may be outputted even in a nonrotational state.

Further, the conventional oscillation gyro is constructed on the premise wherein the force factors and the damping capacitances of the two piezoelectric units are quite the same. However, actually, such a construction is difficult, and the yield of product is poor even if it is possible.

Accordingly, an angular velocity may be outputted even in a nonrotational state due to the difference in the properties of the two piezoelectric units.

Further, the difference in the properties of the piezoelectric units (force factor, damping capacitance etc.) is provided with a temperature characteristic, and therefore, the output of the angular velocity may include an error due to the change in the environmental temperature.

Further, a signal corresponding to a difference between the resistances of the piezoelectric units is caused since the properties of the piezoelectric units are not quite the same, thereby deteriorating the accuracy of the output of the angular velocity.

Further, when a frequency of change of the applied angular velocity is approximately equal to a difference between or a sum of the resonance frequency in the driving-axis direction and the resonance frequency in the detecting-axis direction, the oscillator is resonated in the detecting-axis direction, and outputs a signal which is larger than the actual angular velocity.

Further, it is not possible to inspect the characteristic of a piezoelectric unit which is employed in an oscillation gyro, in a simple way.

SUMMARY OF THE INVENTION

It is an object of the present invention to resolve the above problems and to provide an oscillation gyro having the good accuracy by improving the S/N ratio of the current component caused by the angular velocity.

It is a second object of the present invention to provide an oscillation gyro having the good accuracy by improving the S/N ratio of the current component caused by the angular velocity and to achieve simplification of circuit.

It is a third object of the present invention to provide an oscillation gyro having the good accuracy by improving the S/N ratio of the current component caused by the angular velocity, to achieve the simplification of circuit and to promote the accuracy of gain of the oscillation gyro.

It is a fourth object of the present invention to provide an oscillation gyro having a stabilized motion.

It is a fifth object of the present invention to provide an accurate angular velocity signal by correcting the difference of properties of the piezoelectric units.

It is a sixth object of the present invention to dispense with the influence of an environmental temperature on the output of the angular velocity even if the environmental temperature of the piezoelectric units changes.

It is a seventh object of the present invention to dispense with an error of the output of the angular velocity which is caused by a difference between the resistances of the piezoelectric units.

It is an eighth object of the present invention to eliminate the error of the output of the angular velocity which is caused by the difference between the resistances of the piezoelectric units and to enable to stabilize the motion of an oscillation gyro.

It is a ninth object of the present invention to more firmly dispense with the error of the output of the angular velocity which is caused by the difference between the resistances of the piezoelectric units.

It is a tenth object of the present invention to obtain an output of an accurate angular velocity by preventing the resonance of an oscillator.

It is an eleventh object of the present invention to provide an inspection apparatus which can simply inspect the difference between the properties of the piezoelectric units.

It is a twelfth object of the present invention to provide an inspection apparatus which can simply inspect the difference between the properties of the piezoelectric units and can inspect a temperature characteristic of the difference of the properties.

According to a first aspect of the present invention, there is provided a vibration gyro comprising:

an oscillator;

a plurality of piezoelectric units for oscillating the oscillator in a predetermined driving-axis direction;

piezoelectric unit driving means for driving the plurality of piezoelectric units by supplying an electric power to a common electrode of the plurality of piezoelectric units;

a plurality of current-voltage converting means each for converting a current outputted from each of noncommon electrodes of the plurality of piezoelectric units to a voltage;

eliminating means for eliminating damping components of the plurality of piezoelectric units by amplifying an output of the piezoelectric unit driving means by a predetermined amplification factor, shifting a phase of an amplified signal by a predetermined angle, shunting the amplified signal, and Supplying each of shunted signals to each of the plurality of current-voltage converting means;

adding means for adding outputs of the plurality of current-voltage converting means and for feeding back an added value respectively to the plurality of the current-voltage converting means; and error calculating means for calculating a difference between the outputs of the plurality of current-voltage converting means.

According to a second aspect of the present invention, there is provided the vibration gyro according to the first aspect, wherein the piezoelectric unit driving means is a feedback means for feeding back an output of the adding means to the common electrode of the plurality of piezoelectric elements.

According to a third aspect of the present invention, there is provided the vibration gyro according to the second aspect, wherein the feedback means comprises an added output amplifying means for amplifying the output of the adding means and an amplitude controlling means for controlling an output of the added power amplifying means such that an amplitude of the output of the adding means becomes a predetermined value.

According to a fourth aspect of the present invention, there is provided the vibration gyro according to the first aspect, wherein each of the plurality of current-voltage converting means has a low-pass filter and the adding means has a phase lead compensating means for compensating a lag of a phase caused by the low-pass filter.

According to a fifth aspect of the present invention, there is provided a vibration gyro comprising:

an oscillator;

a plurality of piezoelectric units for oscillating the oscillator in a predetermined driving-axis direction;

piezoelectric unit driving means for driving the plurality of piezoelectric units by supplying an electric power to a common electrode of the plurality of piezoelectric units;

a plurality of current-voltage converting means each for converting a current outputted from each of noncommon electrodes of the plurality of piezoelectric units to a voltage;

eliminating means for eliminating damping components of the plurality of piezoelectric units by amplifying an output of the piezoelectric unit driving means by a predetermined amplification factor, shifting a phase of an amplified signal by a predetermined angle, shunting the amplified signal, and supplying each of shunted signals to each of the plurality of current-voltage converting means;

a first shunt amount controlling means for controlling amounts of the shunted signals;

a second shunt amount controlling means connected to an output terminal of the piezoelectric unit driving means for shunting an output from the piezoelectric unit driving means, supplying shunted outputs respectively to the plurality of current-voltage converting means, and controlling shunt amounts; and error calculating means for calculating a difference between outputs of the plurality of current-voltage converting means.

According to a sixth aspect of the present invention, there is provided a vibration gyro comprising:

an oscillator;

a plurality of piezoelectric units for oscillating the oscillator in a predetermined driving-axis direction;

piezoelectric unit driving means for driving the plurality of piezoelectric units by supplying an electric power to a common electrode of the plurality of piezoelectric units;

a plurality of current-voltage converting means each for converting a current outputted from each of noncommon electrodes of the plurality of piezoelectric units to a voltage;

eliminating means for eliminating damping components of the plurality of piezoelectric units by amplifying an output of the piezoelectric unit driving means by a predetermined amplification factor, shifting a phase of an amplified signal by a predetermined angle, shunting the amplified signal, and supplying each of shunted signals to each of the plurality of current-voltage converting means;

error calculating means for calculating a difference between the outputs of the plurality of current-voltage converting means; and wherein the eliminating means includes temperature detecting means for detecting an environmental temperature and an amplifying means wherein said predetermined amplification factor is changed by the temperature detecting means.

According to a seventh aspect of the present invention, there is provided a vibration gyro comprising:

an oscillator;

a plurality of piezoelectric units for oscillating the oscillator in a predetermined driving-axis direction;

piezoelectric unit driving means for driving the plurality of piezoelectric units by supplying an electric power to a common electrode of the plurality of piezoelectric units;

a plurality of current-voltage converting means each for converting a current outputted from each of noncommon electrodes of the plurality of piezoelectric units to a voltage;

eliminating means for eliminating damping components of the plurality of piezoelectric units by amplifying an output of the piezoelectric unit driving means by a predetermined amplification factor, shifting a phase of an amplified signal by a predetermined angle, shunting the amplified signal, and supplying each of shunted signals to each of the plurality of current-voltage converting means;

error calculating means for calculating a difference between the outputs of the plurality of current-voltage converting means;

synchronism sampling means for outputting a synchronism signal in synchronism with a signal caused by an error of resistance components of the plurality of piezoelectric units based on the output of the piezoelectric unit driving means; and synchronism detecting means connected to an output of the error calculating means for detecting the output of the error calculating means based on the synchronism signal.

According to an eighth aspect of the present invention, there is provided the vibration gyro according to the seventh aspect, wherein the synchronism sampling means includes a phase advancing means for advancing a phase of an output of the piezoelectric unit driving means and is a comparing means for comparing an output of the phase advancing means with a reference value.

According to a ninth aspect of the present invention, there is provided the vibration gyro according to the seventh aspect, wherein the synchronism sampling means includes a phase shifting means for shifting a phase of an output of each of the plurality of the current-voltage converting means by a predetermined angle and is a comparing means for comparing an output of the phase shifting means with a reference value.

According to a tenth aspect of the present invention, there is provided a vibration gyro comprising:

an oscillator;

a plurality of piezoelectric units for oscillating the oscillator in a predetermined driving-axis direction;

piezoelectric unit driving means for driving the plurality of piezoelectric units by supplying an electric power to a common electrode of the plurality of piezoelectric units;

a plurality of current-voltage converting means each for converting a current outputted from each of noncommon electrodes of the plurality of piezoelectric units to a voltage;

eliminating means for eliminating damping components of the plurality of piezoelectric units by amplifying an output of the piezoelectric unit driving means by a predetermined amplification factor, shifting a phase of an amplified signal by a predetermined angle, shunting the amplified signal, and supplying each of shunted signals to each of the plurality of current-voltage converting means;

error calculating means for calculating a difference between the outputs of the plurality of current-voltage converting means;

filter means provided at an output side of the error calculating means for restraining an output in a predetermined frequency domain; and wherein the predetermined frequency domain is adjacent to a frequency approximately equal to a sum of or a difference between a first resonance frequency in a driving-axis direction of the oscillator and a second resonance frequency in a detecting-axis direction of the oscillator.

According to an eleventh aspect of the present invention, there is provided an inspection apparatus for a vibration gyro comprising:

holding means for attachably and detachably holding an oscillating unit comprising an oscillator and a plurality of piezoelectric units provided to the oscillator for oscillating the oscillator in a predetermined driving-axis direction and connecting the oscillating unit to a surrounding circuit;

piezoelectric unit driving means for driving the plurality of piezoelectric units by supplying an electric power to a common electrode of the plurality of piezoelectric units;

a plurality of current-voltage converting means each for converting a current outputted from each of noncommon electrodes of the plurality of piezoelectric units to a voltage;

adding means for calculating outputs of the plurality of current-voltage converting means and feeding back an added value of the outputs respectively to each of the plurality of current-voltage converting means;

error calculating means for calculating a difference between the outputs of the plurality of current-voltage converting means;

added output inspecting means for calculating a first transfer function of the adding means based on an output of the piezoelectric unit driving means and the added value of the adding means;

error calculation output inspecting means for calculating a second transfer function of the error calculating means based on the output of the piezoelectric unit driving means and an output of the error calculating means; and wherein a first difference of resistance components of the plurality of piezoelectric units or a second difference of reactance components of the plurality of piezoelectric components is inspected based on a gain and a phase difference of the error calculation output inspecting means at a resonance frequency in a driving-axis direction of the oscillating unit provided by the added output inspecting means.

According to a twelfth aspect of the present invention, there is provided the inspection apparatus according to the eleventh aspect, further comprising a temperature controlling means for changing an environmental temperature of the oscillating unit.

According to the first aspect of the present invention, the oscillation gyro constructed as above lowers the gain of the current component caused by driving the oscillator and improves the S/N ratio of the current component caused by the angular velocity.

According to the second aspect of the present invention, the adding means operates as the piezoelectric unit driving means thereby simplifying the circuit.

According to the third aspect of the present invention, the gain of the oscillation gyro is stabilized by controlling the amplitude of the output of the adding means to a predetermined value.

According to the fourth aspect of the present invention, the current-voltage converting means are stably operated by providing the low-pass filters to the current-voltage converting means.

According to the fifth aspect of the present invention, the first and the second shunt amount controlling means control shunt amounts and compensate an error which is caused by a difference between the characteristics of the piezoelectric units.

According to the sixth aspect of the present invention, an error which is caused by the change in the environment temperature of the piezoelectric units is compensated by changing the amplification factor of the amplifier by the detected output of the temperature detecting means.

According to the seventh aspect of the present invention, an error in the output of the angular velocity which is caused by the difference between resistances of the piezoelectric units by detecting the output of the error calculating means based on a signal which is caused by the error of the resistance components.

According to the eighth aspect of the present invention, the synchronism sampling means detects the output of the error calculating means based on the output of the piezoelectric unit driving means.

According to the ninth aspect of the present invention, the synchronism sampling means detects the output of the error calculating means based on the output of the current-voltage converting means.

According to the tenth aspect of the present invention, the filter means restrains an output of the error calculating means in the frequency domain in which the oscillator is resonated.

According to the eleventh aspect of the present invention, the inspection apparatus for a vibration gyro inspects only the oscillating unit by rendering the oscillating unit attachable and detachable, and inspects the difference between the properties of the piezoelectric units by the added output inspecting means and the error calculation output inspection means.

According to the twelfth aspect of the present invention, the temperature controlling means also inspects a temperature characteristic of the difference between the properties of the piezoelectric units by changing the environmental temperature of the oscillating unit.

DETAILED DESCRIPTION OF THE INVENTION

EMBODIMENT 1

Figure 3:
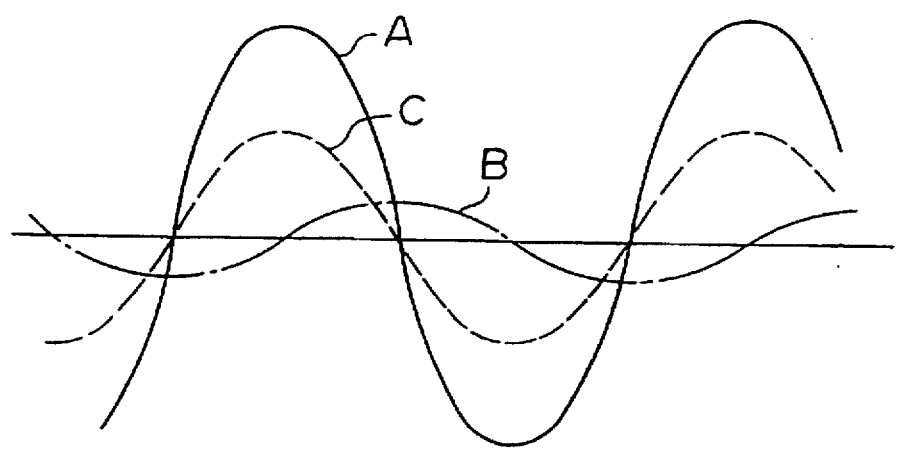
FIG. 3 illustrates waveform diagrams of output signals of a current-voltage converter.

FIG. 3 shows an output signal of a current-voltage converter by separating it to a component caused by driving an oscillator and a component caused by an angular velocity, wherein the bold line A is a component caused by driving an oscillator, and the one-dotted chain line B is a component caused by an angular velocity. What an oscillating gyro wants to pick up is the signal of the one-dotted chain line, of which S/N ratio is poor since it is considerably small compared with the bold line A as illustrated. Therefore, in the Embodiment 1, the bold line A is made smaller as the broken line C by decreasing a gain of the component caused by driving an oscillator, thereby improving the S/N ratio of the one-dotted chain line B.

Figure 1:
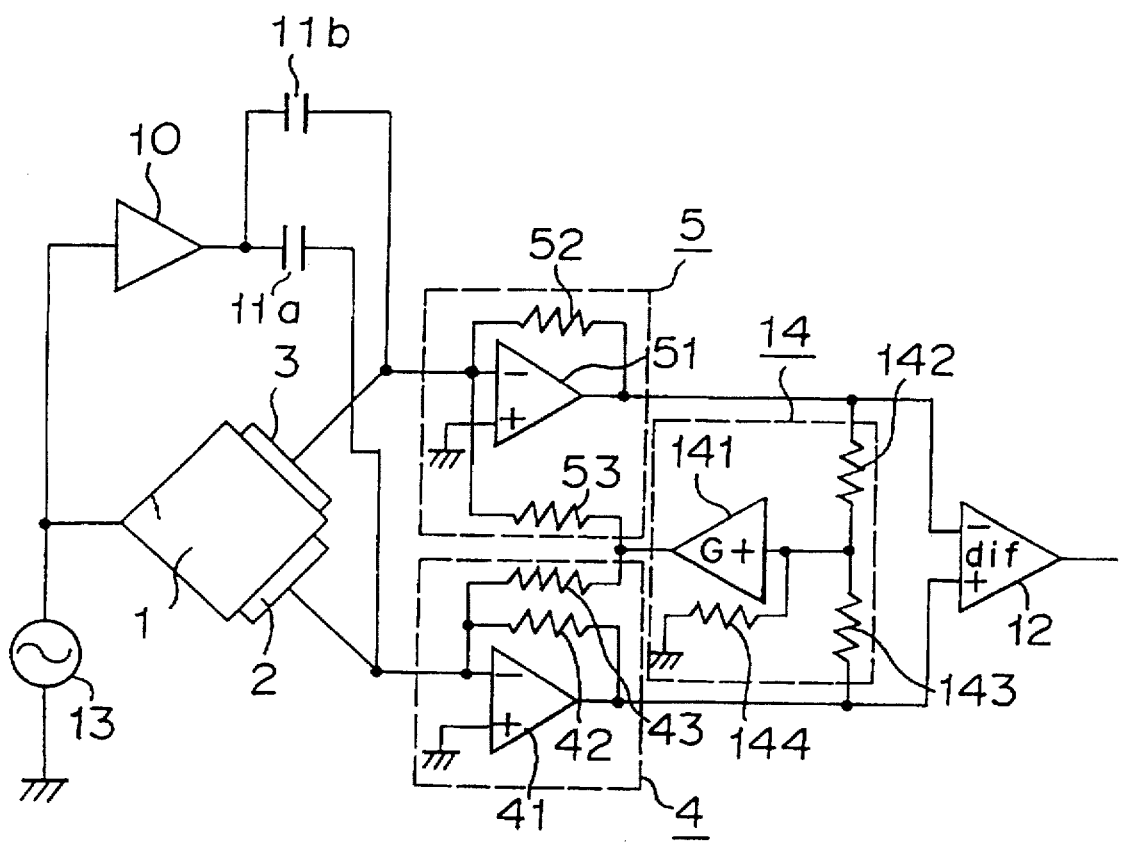
FIG. 1 is a construction diagram showing embodiment 1.

FIG. 1 is a construction diagram showing the embodiment 1 of this invention. In FIG. 1, a portion which is the same as or corresponding to that in the conventional example is provided with a notation the same as in the conventional example and the explanation will be omitted.

In FIG. 1, numeral 13 designates a voltage source as a piezoelectric unit driving means for generating a voltage of a frequency which is equal to the resonance frequency in the driving-axis direction of an oscillator 1, and numeral 14 designates an adder as an adding means. The input side of the adder 14 is respectively connected to the outputs of current-voltage converters 4 and 5 and the output side thereof is respectively connected to the input sides of the current-voltage converters 4 and 5. In this Figure, an externally-excited oscillation type oscillation gyro is exemplified.

Figure 2:
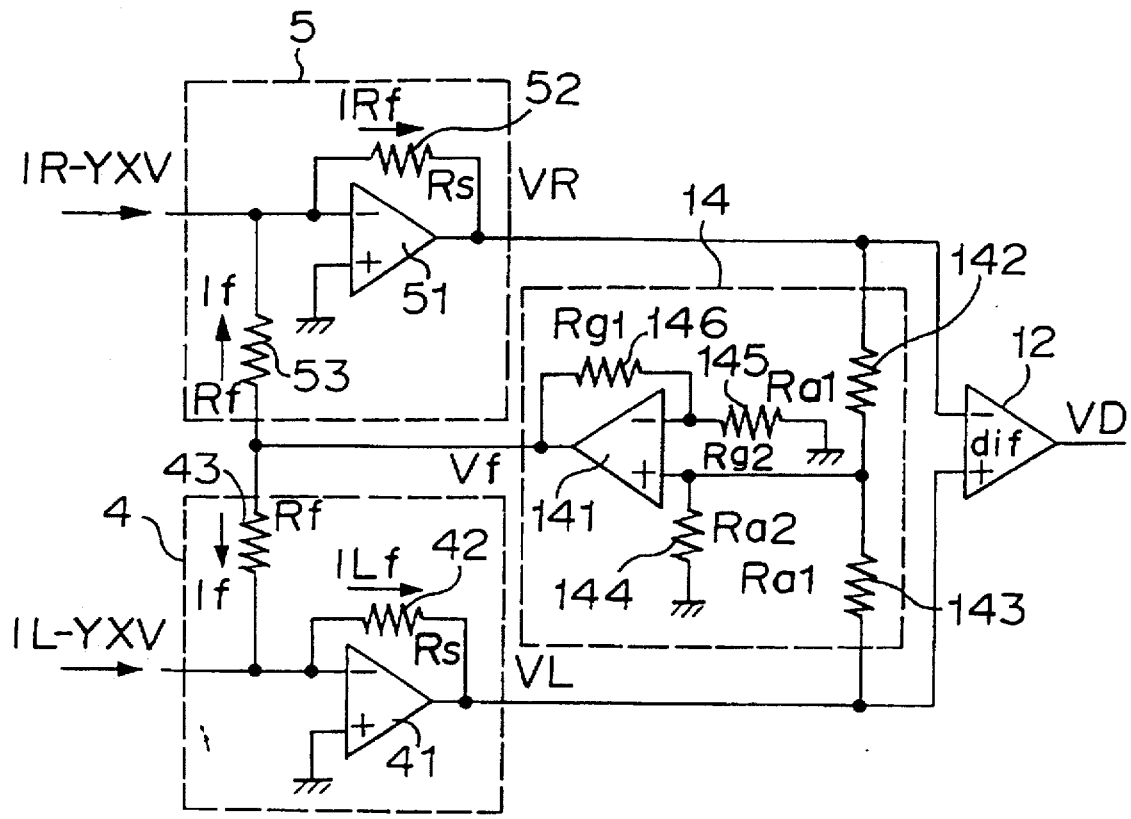
FIG. 2 is a diagram magnifying important parts of FIG. 1.

FIG. 2 shows a diagram magnifying important parts of FIG. 1 and the explanation will be given of the operation by using FIG. 2.

There are a current IL flowing in the piezoelectric unit 2 and a current (−Y×V) from a condenser 11a at the input side of the current-voltage converter 4. Similarly, there are a current IR flowing in the piezoelectric unit 3 and a current (−Y×V) from a condenser 11b at the input side of the current-voltage converter 5.

Now, as mentioned above, an output signal from the adder 14 is fed back to each of the input sides of the current-voltage converters 4 and 5 through each of resistors 43 and 53. When the output voltage of the adder 14 is defined as Vf, and the resistance value of the resistors 43 and 53 as Rf, a current If which is fed back to each of the current-voltage converters 4 and 5 is expressed by the following equation.

$$If = Vf/Rf \tag{25}$$

Therefore, currents ILf and IRf respectively flowing in resistors 42 and 52 which are the current-voltage converting resistors are expressed by the following equations.

$$ILf = IL - Y \times V + If \tag{26}$$

$$IRf = IR - Y \times V + If \tag{27}$$

Accordingly, when the resistance value of the resistors 42 and 52 are defined as Rs, output voltages VL and VR of the current-voltage converters 4 and 5 are expressed by the following equations.

$$VL = -ILf \times Rs \tag{28}$$

$$VR = -IRf \times Rs \tag{29}$$

On the other hand, the adder 14 in receiving the output signals VL and VR of the current-voltage converters 4 and 5, performs an addition by resistors 142 through 144 in the adder, and outputs a voltage Vf by performing an amplification by using resistors 145 and 146, which is shown as follows.

$$Vf = 1 + \frac{Rg1}{Rg2} \times \frac{Ra2}{Ra1 + 2 \times Ra2} \times (VL + VR) \tag{30}$$

The equations (28) and (29) are calculated by defining the first and the second term of the equation (30) as G, of which result is shown as follows.

$$VL = -Rs \times \left\{ (IL - Y \times V) + G \times \frac{VL + VR}{Rf} \right\} \tag{31}$$

$$VR = -Rs \times \left\{ (IR - Y \times V) + G \times \frac{VL + VR}{Rf} \right\} \tag{32}$$

Accordingly, an output signal VD of the differential amplifier 12 is expressed as follows by defining the amplification factor thereof as GD.

$$VD = GD \times (VL - VR) = -GD \times Rs \times (IL - IR) \tag{33}$$

It is understood from the equation (33) that the angular velocity can be detected on the basis of the principle which has been shown in the conventional example, since the output signal VD from the differential amplifier 12 becomes a voltage corresponding to a difference between the currents flowing in the piezoelectric units 2 and 3.

Now, in this case, a gain of a component in the driving-axis direction and a gain of a component in the output-axis direction in the current-voltage converters 4 and 5, will be calculated.

A consideration will be given to the component in the driving-axis direction of currents flowing in the piezoelectric units 2 and 3, that is, a current component caused by driving the oscillator. This is a component having the same phase with respect to the piezoelectric units 2 and 3, and therefore, I=IL=IR. By this relationship and the equations (28) through (32), the output voltage VP with respect to the same phase components of the current-voltage converters 4 and 5 is as follows.

$$VP = -Rs \times (I + G \times Rf \times 2 \times VP) \tag{34}$$

The above equation is rearranged with respect to VP as follows.

$$VP = \times Rs - I(1 + 2 \times G \times Rf \times Rs) \tag{35}$$

Accordingly, conventionally, the gain of the current component caused by driving the oscillator in the current-voltage converters 4 and 5 is $-Rs$. By contrast, in this embodiment, the gain is reduced to $-Rs/(1+2\times G\times Rf\times Rs)$. Therefore, the current component caused by driving the oscillator can be made smaller as in the broken line C of FIG. 3.

On the other hand, consideration will be given to a component in the detecting-axis direction of currents flowing in the piezoelectric units 2 and 3, that is, current components caused by the angular velocity. They are phase components negative with each other with respect to the piezoelectric units 2 and 3, and therefore, I=IL=-IR. By this relationship and the equations (26) through (29), the following equations are provided.

$$VL = -Rs \times (I + If) \tag{36}$$

$$VR = -Rs \times (-I + If) \tag{37}$$

The equation (36) is added with the equation (37), as follows.

$$VL + VR = 2 \times Rs \times If \tag{38}$$

The equation (25) is substituted by the equation (30) and the equation (38), as follows.

$$If = (G \times 2 \times Rs \times If)/Rf \tag{39}$$

G, Rs and Rf are constants. Therefore, the only condition satisfying the equation (39) is If=0. This condition is substituted to the equations (36) and the equation (37), as follows.

$$VL = -Rs \times I \tag{40}$$

$$VR = Rs \times I \tag{41}$$

As is understood from the equations (40) and (41), the gain of the current component caused by the angular velocity in the current-voltage converter is Rs as in the conventional example, which is not influenced by the feeding-back from the adder 14 to the current-voltage converters 4 and 5.

Accordingly, only the gain of the current component caused by driving the oscillator can be lowered by the feeding-back from the adder 14 to the current-voltage converters 4 and 5, thereby promoting the S/N ratio of the current component caused by the angular velocity.

Figure 4:
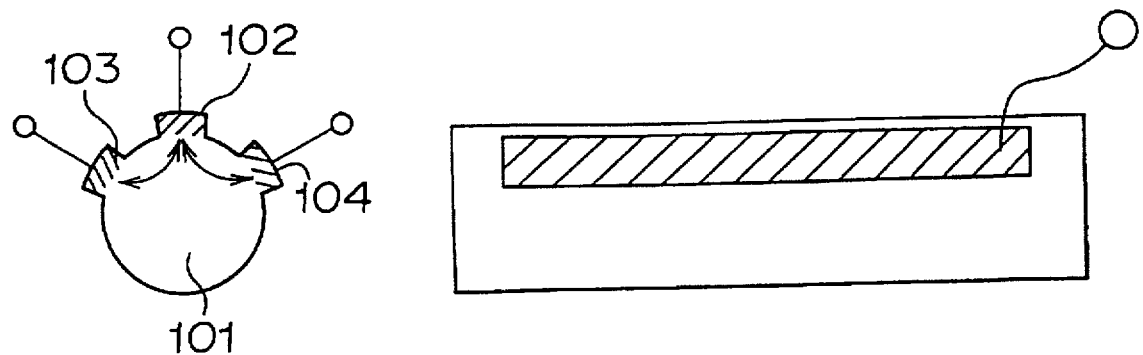
FIG. 4 is a construction diagram showing an oscillator and piezoelectric units having a construction different from that of FIG. 1.

Further, FIG. 4 shows an oscillator and piezoelectric units having a construction which is different from that in FIG. 1. Numeral 101 designates an oscillator which is made of a piezoelectric material, and numerals 102 through 104 designate piezoelectric units which are formed at three portions of column faces of the oscillator 101. This construction is applicable to the embodiment 1 or to the following embodiments by rendering the piezoelectric unit 102 a common electrode and the piezoelectric units 103 and 104 noncommon electrodes.

EMBODIMENT 2

In the Embodiment 1, an externally-excited oscillation type oscillation gyro has been shown. Embodiment 2 provides a simplification of circuit in case wherein the Embodiment 1 is applied in a self-excited oscillation type oscillation gyro.

Figure 5:
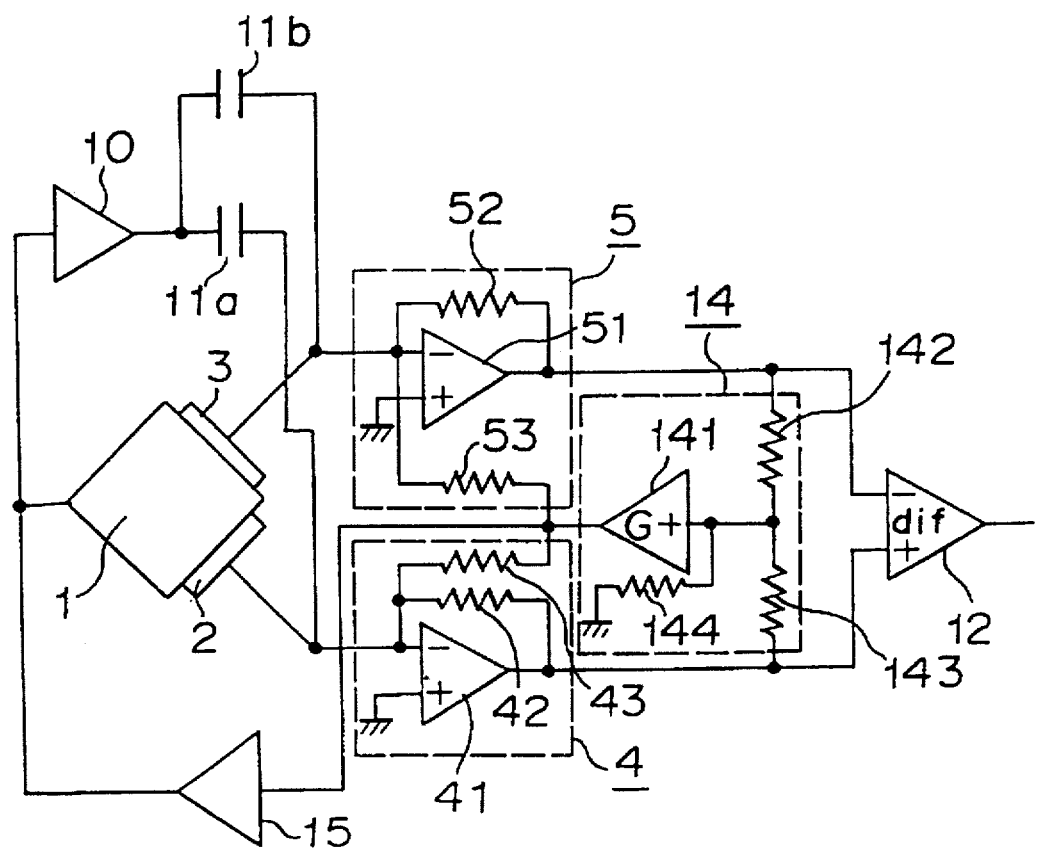
FIG. 5 is a construction diagram showing embodiment 2.

FIG. 5 is a construction diagram showing Embodiment 2. In FIG. 5, in comparison with FIG. 1, an amplifier 15 is added which is a feedback means for feeding back the output signal of the adder 14 to the oscillator 1. In this Example, the amplifier 15 also operates as a piezoelectric unit driving means. Further, the feedback means is not restricted to the amplifier 15 as shown, but may be any means so far as the output signal of the adder 14 is supplied to the oscillator 1 by a feeding-back operation,, which may be, for instance, a lead wire connecting the output terminal of the adder 14 and the oscillator 1.

The output signal of the adder 14 is, as explained above, a signal (IL+IR−2×Y×V) which corresponds to the sum of currents wherein the damping capacitance component Y of the respective piezoelectric unit is subtracted from the currents IL and IR which flow when the same potential V is applied on the piezoelectric units 2 and 3.

Accordingly, as has been explained above by using the equation (23), when the output signal of the adder 14 is fed back to the oscillator 1, the oscillator 1 is oscillated in a self-excited oscillation in the driving-axis direction at its resonance frequency.

Accordingly, even in case of the oscillation gyro of the self-excited oscillation type, the above embodiment 1 can simply be applied.

Figure 25:
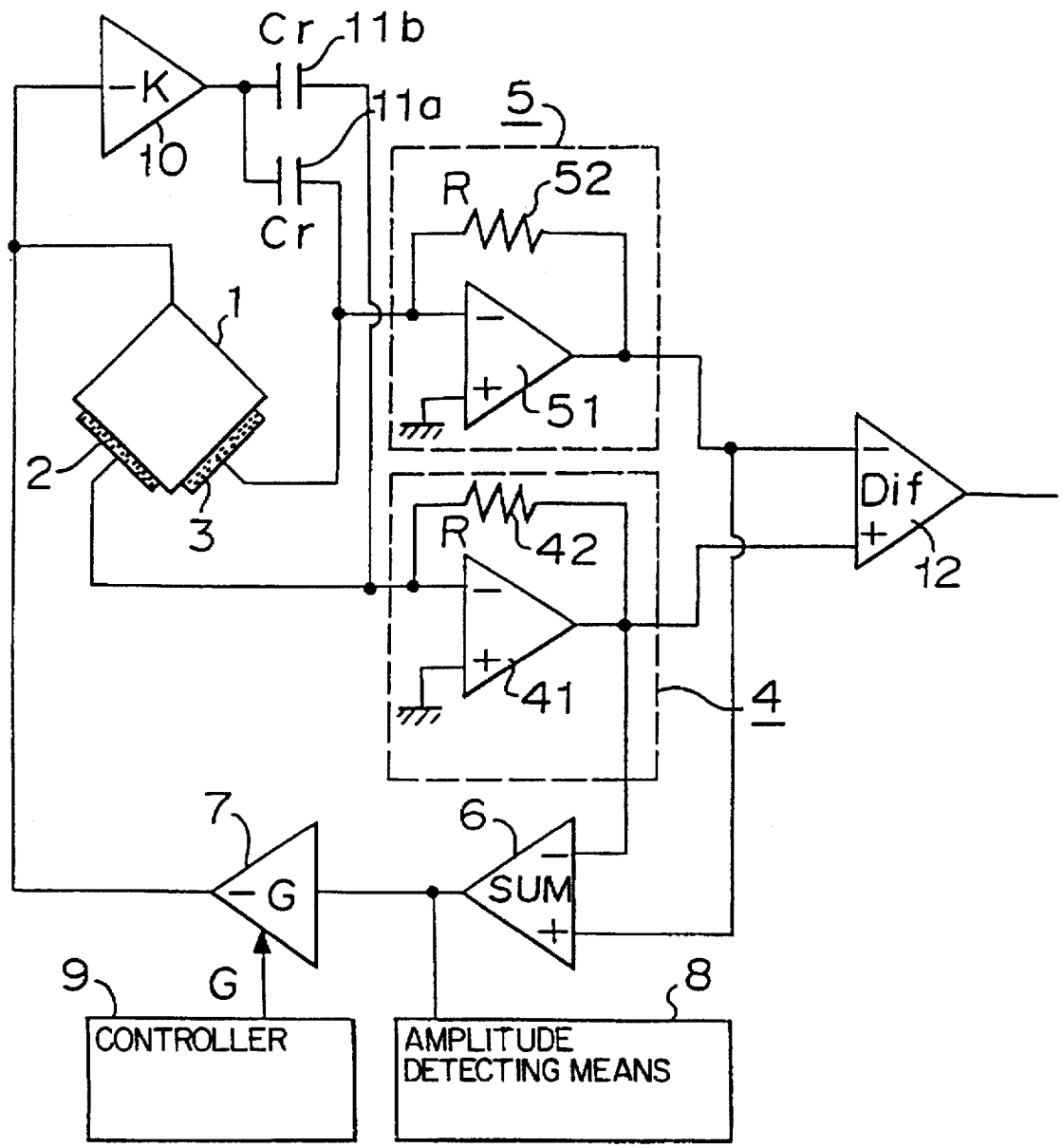
FIG. 25 is a construction diagram showing a conventional oscillation gyro.
Figure 26:
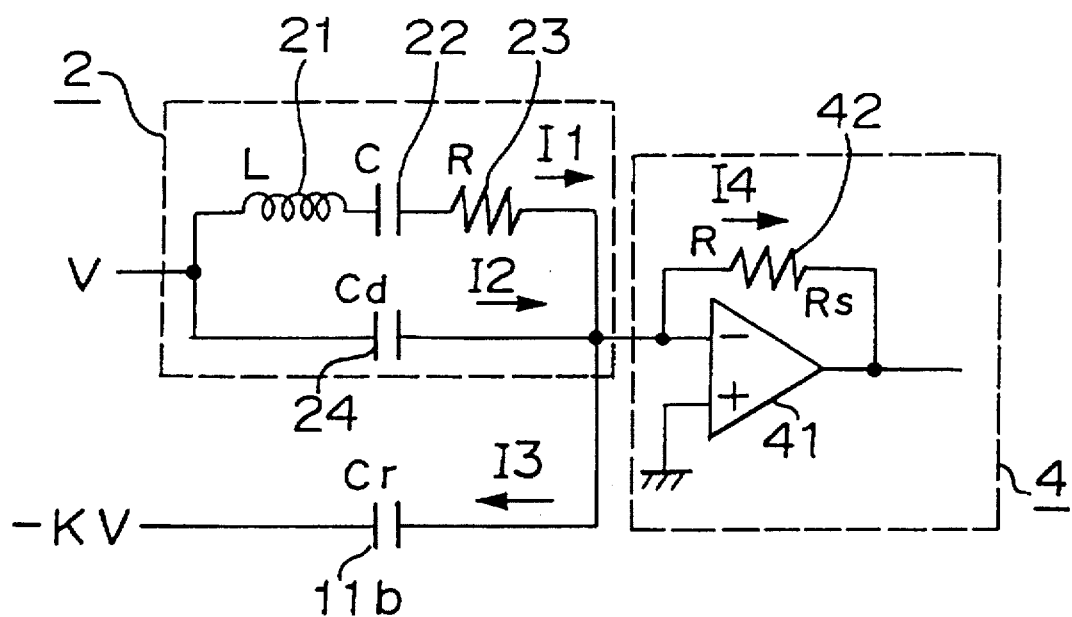
FIG. 26 is a diagram magnifying important parts of FIG. 25 for explaining the operation of current-voltage converters.
Figure 27A:
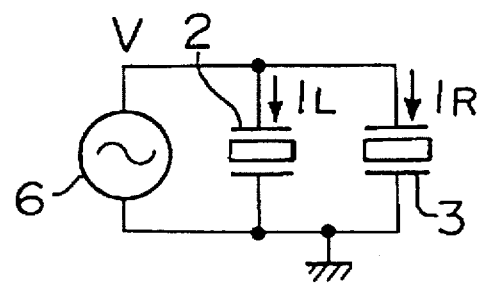
FIGS. 27a, 27b, 27c and 27d are diagrams for vectors for explaining the principle of an oscillation gyro.
Figure 27B:
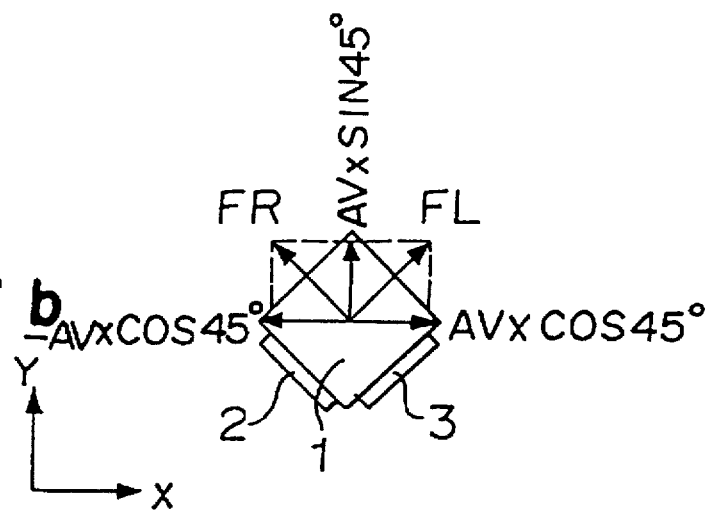
Figure 27C:
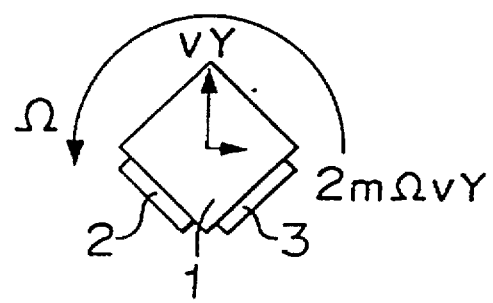
Figure 27D:
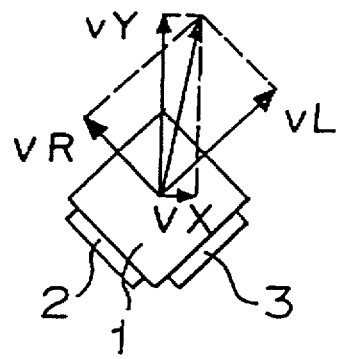

Further, the adder 14 in FIG. 5 operates as both the adder 6 in FIG. 25 and the adder 14 in FIG. 1.

Therefore, it is possible to reduce one set of adder, which can simplify the circuit.

EMBODIMENT 3

Figure 6:
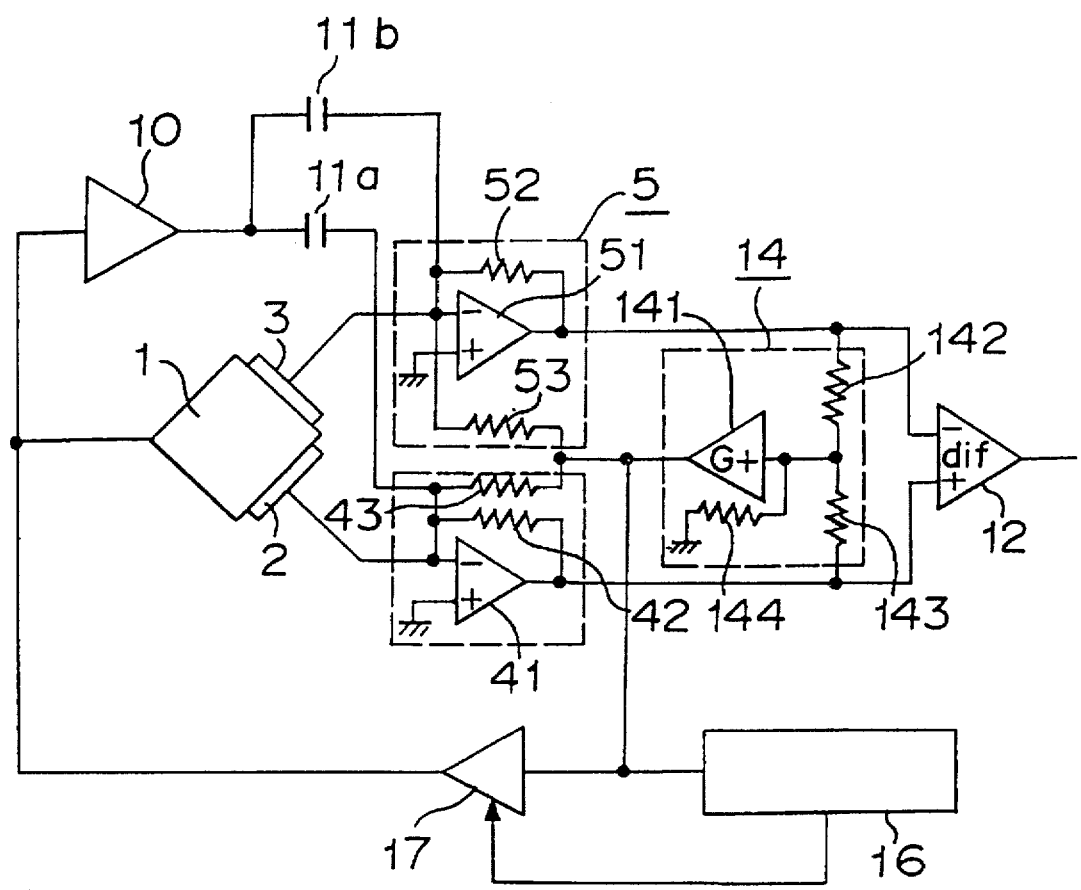
FIG. 6 is a construction diagram showing embodiment 3.

Embodiment 3 promotes the accuracy of gain in Embodiment 2. FIG. 6 shows a construction diagram of Embodiment 3. In FIG. 6, in comparison with FIG. 5, an amplitude controller 16 is added which is an amplitude controlling means. Numeral 17 designates an amplifier which is an added outputs amplifying means for amplifying the output signal of the adder 14, and of which amplification factor is changed by the amplitude controller 16.

In the mean time, the amplitude controller 16 controls the amplification factor of the amplifier 17 so that the amplitude of the output signal of the adder 14 becomes a predetermined value. Accordingly, the output signal (IL+IR−2×Y×V) (wherein Y=YL=YR) of the adder 14 becomes constant and the equation (22) is established.

Accordingly, the gain of the signal caused by the angular velocity, of the differential amplifier 12 with respect to the angular velocity, is determined by the equivalent mass of the oscillator 1 and the mechanical impedance in the detecting-axis direction.

Therefore, in comparison with Example 2, the gain of the output signal of the differential amplifier 12 with respect to the angular velocity does not change and is stabilized, whereby the accuracy of gain is promoted.

EMBODIMENT 4

In FIG. 1, the current-voltage converter 4 is a differentiating circuit comprising the condenser 11a and the resistor 42. This is also the same in the current-voltage converter 5. In the meantime, generally the operation of a differentiating circuit is difficult to stabilize and the circuit may be oscillated. Embodiment 4 has regard to this point, which intends to stabilize the operation of an oscillation gyro by achieving the stability of operation of the differentiating circuit.

Figure 7:
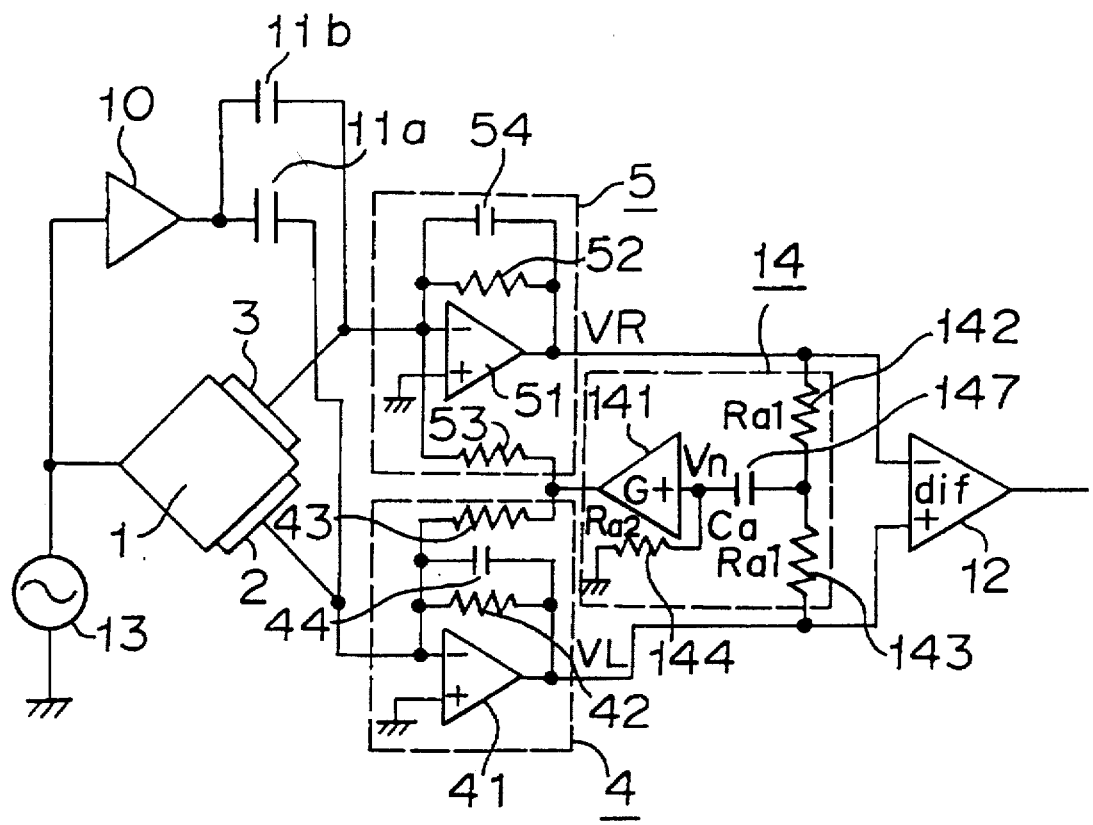
FIG. 7 is a construction diagram showing embodiment 4.

FIG. 7 shows the construction of Embodiment 4. In FIG. 7, in comparison with FIG. 1, condensers 44, 54 and 147 are added.

Figure 8:
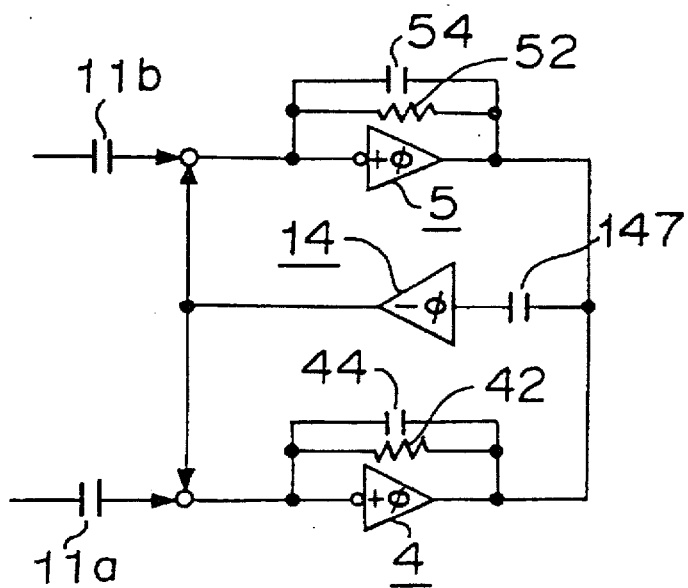
FIG. 8 is a block diagram showing embodiment 4.

A simple explanation will be given of the technological thought of Embodiment 4 by using FIG. 8. First, it is effective for stabilizing the operation of the differentiating circuit to construct low-pass filters by connecting the condensers 44 and 54 in parallel with the resistors 42 and 52. However, when the condensers 44 and 54 are connected, the phases of the output signals of the current-voltage converters 4 and 5 are retarded. To resolve this, the adder 14 is added with the condenser 147, by which the phase of the output signal of the adder 14 is advanced. The condenser 147 and the resistor 144 constitute a phase lead compensating means. The phase lag of the output signal of the adder 14 which has been caused by the low-pass filters, is compensated by the phase lead compensating means and the output signal is fed back respectively to the current-voltage converters 4 and 5.

Now, a detailed explanation will be given of the Embodiment 4.

The output signals of the current-voltage converters 4 and 5 are produced by converting the each of inputted currents to a voltage and by processing it through a first-order lag filter. The output signals of the current-voltage converters 4 and 5 will be provided as follows by defining each of the inputted currents as I, the frequency, as ω, the resistance value of each of the resistors 42 and 52, as Rs, and the capacitance of each of the condensers 44 and 54, as Cs.

$$VLR(j\omega) = VL(j\omega) = VR(j\omega) \qquad (42)$$
$$= -\{1/(1 + Rs \times Cs \times j\omega)\} \times I$$

The oscillator 1 is driven at the resonance frequency ωY in the driving-axis direction of the oscillator 1. Therefore, at this frequency, the phase difference of the current I flowing in each of the piezoelectric units 2 and 3 with respect to the output voltage VLR (=VL=VR) of each of the current-voltage converters 4 and 5, is expressed by the following equation.

$$\angle VLR/I = \text{arc tan } (Rs \times Cs \times j\omega Y) \qquad (43)$$

The output signals of the current-voltage converters 4 and 5 each has the phase difference of the equation (43) with respect to each of the currents flowing in the piezoelectric units 2 and 3. Accordingly, the output signal of the angular velocity of the differential amplifier 12 has the phase difference of the equation (43) with respect to the output signal of the angular velocity which has been shown in the conventional example. Even if such a signal is fed back to each of the current-voltage converters 4 and 5 by simply adding them as has been explained in Embodiment 1, the effect shown in Embodiment 1 is not provided, since the fed-back signal has the phase difference of the equation (43) with respect to the signal in Embodiment 1.

Therefore, in Embodiment 4, the adder 14 is constructed as in FIG. 7. One end of each of the resistors 142 and 143 is connected to each of the output ends of the current-voltage converters 4 and 5, and the other ends are connected to one end of the condenser 147. The other end of the condenser 147 is connected to the input end of the non-inverting amplifier 141, the former end is connected to one end of the resistor 144 of which other end is grounded. This non-inverting amplifier 141 amplifies the voltage Vn at the input terminal in the same phase by a gain of G. Therefore, the output signal Vf is given by the following equation.

$$Vf = G \times Vn \qquad (44)$$

At this point, a relationship between the input voltage Vn of the non-inverting amplifier 141 and the sum of the output signals of VL and VR of the current-voltage converters 4 and 5.

$$\frac{Vn}{VL + VR} = \frac{Ra2}{Ra1 + 2 \times Ra2} \times \qquad (45)$$

-continued $$\frac{j\omega \times Ca \times \left(Ra2 + \frac{Ra1}{2}\right)}{1 + j\omega \times Ca \times \left(Ra2 + \frac{Ra1}{2}\right)}$$

It is understood from the equation (45) that the output signals of the current-voltage converters 4 and 5 are added and amplified by the adder 14 through a high-pass filter having a time constant which is determined by the resistors 142, 143 and 144 and the condenser 147.

Further, from the equation (45), the phase difference of the output signal Vf of the adder 14 with respect to the signal (VL+VR) which is formed by adding the output signals of the current-voltage converters 4 and 5, at the resonance frequency ωY in the driving-axis direction of the oscillator 1, is provided as follows.

$$< \frac{Vf}{VL + VR} = \arctan \frac{1}{\left(Ra2 + \frac{Ra1}{2}\right) \times Ca \times j\omega Y} \quad (46)$$

In the meantime, the phase relationship in Embodiment 1 is shown by the following equation.

$$\angle Vf - \angle Vf/(VL+VR) = 180° \quad (47)$$

Accordingly, the operation of the current-voltage converters 4 and 5 can be stabilized and the S/N ratio of the current components caused by the angular velocity can be promoted by setting constants of the current-voltage converters 4 and 5 and the adder 14 such that the equation (47) is satisfied.

EMBODIMENT 5

The above embodiments have been performed on the premise wherein the characteristics of the piezoelectric units 2 and 3 are quite the same. However, ordinarily, the force factors or the damping capacitances of the piezoelectric units 2 and 3 are actually different, and therefore, even if the same potential V is supplied to the piezoelectric units 2 and 3, the respective flowing currents are different. Accordingly, even if a difference between the currents flowing in the piezoelectric units 2 and 3 is detected by using the differential amplifier 12, the output signal is not only the signal caused by the angular velocity but is superposed with the signals caused by the differences between the reactance components and the resistance components of the piezoelectric units 2 and 3.

Embodiment 5 intends to accurately detect the angular velocity signal by correcting an error due to the difference in the characteristics of the piezoelectric units 2 and 3 as mentioned above.

Figure 9:
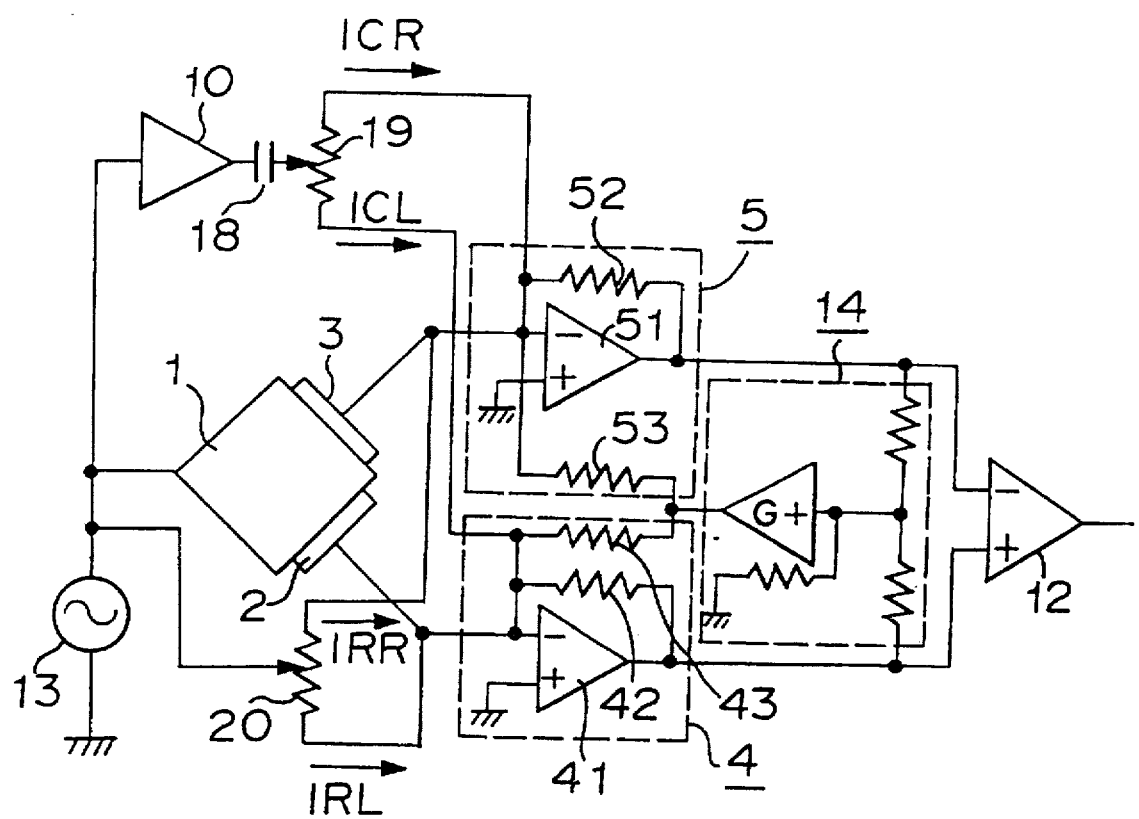
FIG. 9 is a construction diagram showing embodiment 5.

FIG. 9 shows the construction of Embodiment 5. Numeral 18 designates a condenser one end of which is connected to the output of the amplifier 10 and the other end of which is connected to a middle point of an adjustable resistor 19 which is a first divider amount controlling means. The both ends of the adjustable resistor 19 are respectively connected to the input ends of the current-voltage converters 4 and 5. The adjustable resistor 19 dividers the current flowing through the condenser 18 into ICL and ICR, and controls the divider amounts. Numeral 20 designates an adjustable resistor which is a second divider amount Controlling means, wherein a middle point thereof is connected to the output end of the voltage source 13 and the both ends thereof are connected respectively to the input ends of the current-voltage converters 4 and 5. The adjustable resistor 20 dividers the current frommthe voltage source 13 into IRL and IRR and controls the divider amounts.

There are differences of resistance components and reactance components in the piezoelectric units 2 and 3. The difference between the respective admittances is defined as ΔYR and the difference between admittances of the reactance components is defined as ΔYX. Further, the difference of the currents flowing in the piezoelectric units 2 and 3 is defined as ΔI and the voltage applied on the piezoelectric units is defined as V. Then, ΔI is provided by the following equations.

$$\Delta I = V \times \Delta YR \times \sin(\omega \times t) + V \times \Delta YX \times \cos(\omega \times t) \quad (48)$$

At this point, when the total resistance value of the adjustable resistor 20 is expressed by RR and the position-of the middle point is expressed by KR, the currents IRL and IRR which have been divided by the adjustable resistor 20, are determined by the following equations.

$$IRL = \{V/(RR \times KR)\} \times \sin(\omega \times t) \quad (49)$$

$$IRR = \{V/(RR \times (1-KR))\} \times \sin(\omega \times t) \quad (50)$$

A difference ΔIR between the currents IRL and IRR is provided by the equations (49) and (50) as follows.

$$\begin{aligned} \Delta IR &= IRL - IRR \quad (51) \\ &= \frac{V}{RR} \times \frac{1 - 2 \times KR}{KR \times (1 - KR)} \times \sin(\omega \times t) \end{aligned}$$

Accordingly, the first term of the equation (48) can be eliminated by adjusting the position KR of the middle point of the adjustable resistor 20.

In the meantime, the condenser 18 and the adjustable resistor 19 which are connected to the amplifier 10 constitute a high-pass filter. Accordingly, when the cutoff frequency of this high-pass filter is sufficiently high in comparison with the resonance frequency in the driving-axis direction of the oscillator 1, the high-pass filter operates as a condenser with respect to the resonance frequency in the driving-axis direction.

A more detailed explanation will be given thereof.

When the amplification factor of the amplifier 10 is defined as GC, the admittance of the condenser 18, as YX, and the total resistance value of the adjustable resistor 19, as RC and the position of the middle point, as KC, the currents ICL and ICR flowing from the middle point to the both-ends of the adjustable resistor 19 are expressed by the following equations.

$$ICL = -KC \times GC \times YX \times V \times \cos(\omega \times t) \quad (52)$$

$$ICR = -(1-KC) \times GC \times YX \times V \times \cos(\omega \times t) \quad (53)$$

A difference ΔIC between the currents ICL and ICR is provided from the equations (52) and (53), as follows.

$$\begin{aligned} \Delta IC &= ICL - ICR \quad (54) \\ &= (1 - 2 \times KC) \times GC \times YX \times V \times \cos(\omega \times t) \end{aligned}$$

Therefore, the second term of equation (48) can be eliminated by adjusting the position KC of the middle point of the adjustable resistor 19.

As stated above, the error of the output signal of the differential amplifier 12 which is caused by the difference between the resistance components of the piezoelectric units 2 and 3 can be eliminated by adjusting the position of the middle point KR of the adjustable resistor 20, whereas the error of the output signal of the differential amplifier 12 caused by the difference between the reactance components of the piezoelectric units 2 and 3, can be eliminated by adjusting the position of the middle point KC of the adjustable resistor 19.

Next, an explanation will be given of an influence of the valuable resistors 19 and 20 on the output signal of the adder 14.

The output signal of the adder 14 is a signal corresponding to the total sum of the currents IL and IR from the piezoelectric units 2 and 3 and the output currents of the compensating circuits. Therefore, $$IL + IR + IRL + IRR + ICL + ICR = IL + IR + \qquad (55)$$

$$\frac{V}{RR \times KR \times (1-KR)} \times \sin(\omega \times t) - GC \times YX \times V \times \cos(\omega \times t)$$

As is understood from equation (55), the position of the middle point KR of the adjustable resistor 20 contributes only to the amplitude of the components the adder 14 having the same phase as the applied voltage V. Further, the influence of the position of the middle point KR on the amplitude of the component having the same phase, can be disregarded by rendering the total resistance value RR of the adjustable resistor 20 a sufficiently large value compared with the resistance components of the piezoelectric units 2 and 3.

Accordingly, not only can the error of the output signal of the differential amplifier 12 caused by the difference between the resistance components of the piezoelectric units be eliminated by adjusting the position of the middle point KR of the adjustable resistor 20, but can the influence of the adjustable resistor 20 on the output signal of the adder 14 be disregarded by rendering the resistance value RR sufficiently large.

In the equation (55), the middle point KC of the adjustable resistor 19 is eliminated. Accordingly, even if the middle point KC is adjusted to eliminate the error of the output signal of the differential amplifier 12 caused by the difference between the reactance components of the piezoelectric units 2 and 3, there is no influence which is applied on the output signal of the adder 14.

Therefore, the-operation of eliminating the error of the output signal of the differential amplifier 12 caused by the difference between the resistance components of the piezoelectric units 2 and 3, and the operation of eliminating the error of the output signal of the differential amplifier 12 caused by the difference between the reactance components, can be performed independently from each other.

The amplifier 10 and the condenser 18 constitute an eliminating means for eliminating the damping capacitance components of the piezoelectric units 2 and 3. The operation of eliminating the damping capacitance. components can be performed independently from the operation of eliminating the error caused by the difference between the resistance components or the reactance components.

In equation (55), when the total resistance value RR of the adjustable resistor 22 is sufficiently large in comparison with the resistance components of the piezoelectric units 2 and 3, the influence by the position of the middle point KR can be disregarded. Therefore, equation (55) can be regarded as the following equation.

$$(\text{Output of adder}) = IL + IR - GC \times YX \times V \times \cos(\omega \times t) \qquad (56)$$

As mentioned above, the output signal of the adder is the sum of the currents IL and IR flowing in the piezoelectric units 2 and 3 subtracted by the damping capacitance components (2×Y×V).

Accordingly, the following equation is established from the equation (56).

$$IL + IR - GC \times YX \times V \times \cos(\omega \times t) = IL + IR - 2 \times y \times V \qquad (57)$$

In the above equation, since 2Y=YL+YR, equation (57) is rearranged by using this relationship, as follows.

$$GC \times YX \times \cos(\omega \times t) = YL + YR \qquad (58)$$

Accordingly, when the amplification factor GC of the amplifier 10 is adjusted so that GC×YX=YL×YR is established, cos(ωxt)=1. Therefore, the equation (57) can be modified as follows whereby the damping capacitance components of the piezoelectric units 2 and 3 can be eliminated.

$$IL + IR - GC \times YX \times V \times \cos(\omega \times t) = \qquad (59)$$
$$IL + IR - YL \times YR \times V \times \cos(\omega \times t) = IL + IR - YL \times YR \times V$$

In this way, the operation of eliminating the damping capacitances may be operated only by adjusting the amplification factor GC of the amplifier 10, irrespective of the operation of eliminating the above errors.

EMBODIMENT 6

Embodiment 6 intends to compensate an error which is caused by a change of the characteristic of the piezoelectric units 2 and 3 with a change in an environmental temperature.

Figure 10:
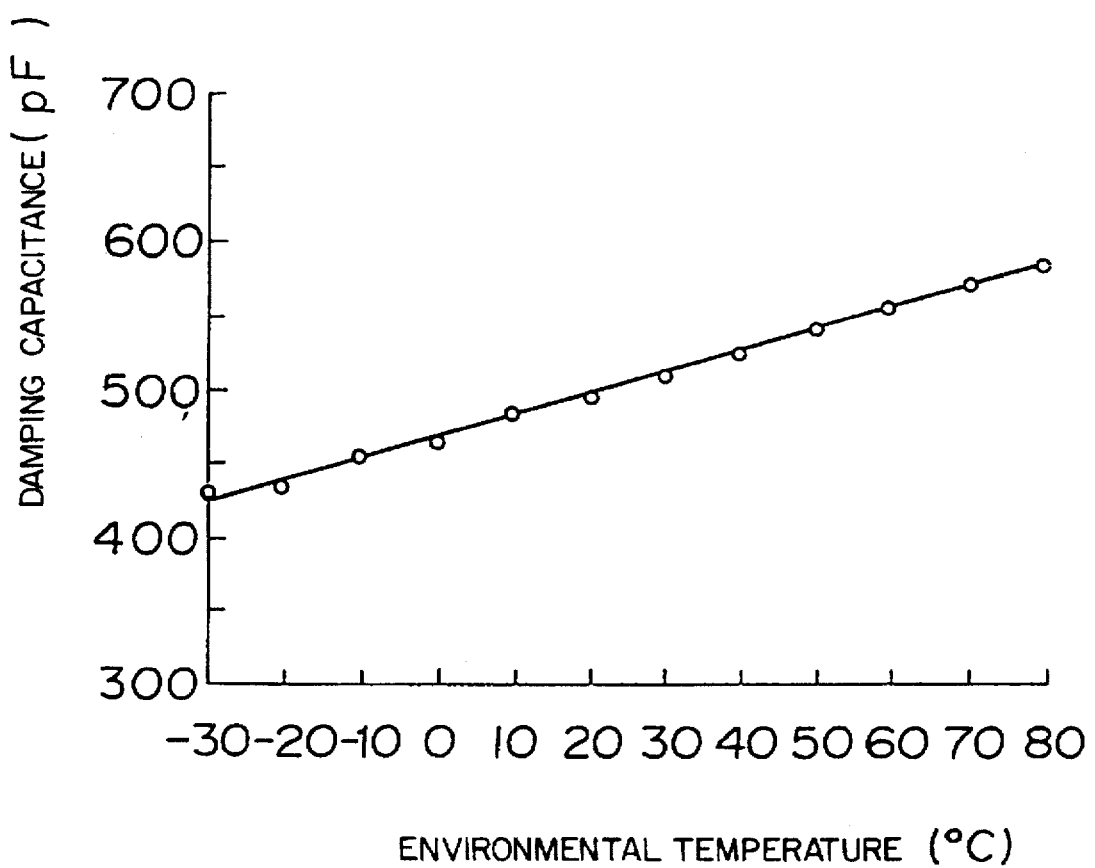
FIG. 10 is a characteristic diagram showing a temperature characteristic of a damping capacitance of a piezoelectric unit.

The temperature characteristic of the damping capacitances of the piezoelectric units 2 and 3 changes with a temperature coefficient of 0.3%/°C, as shown by FIG. 10. Further, the temperature coefficients of the two piezoelectric units are equal, and therefore, the difference between the outputs thereof changes with the temperature coefficient of 0.3%/°C.

Accordingly, when the admittance at a predetermined temperature T0 is defined as Y0, the admittance Y(T) of the damping capacitance at an arbitrary temperature T is expressed by the following equation.

$$Y(T) = Y0 \times \{1 + 0.003 \times (T - T0)\} \qquad (60)$$

Therefore, it is necessary for eliminating the damping capacitance component to form the output signal of the adder as follows.

$$IL + IR - 2 \times Y(T) \times V = IL + IR - 2 \times Y0 \times \{1 + 0.003 \times (T - T0)\} \qquad (61)$$

Figure 11:
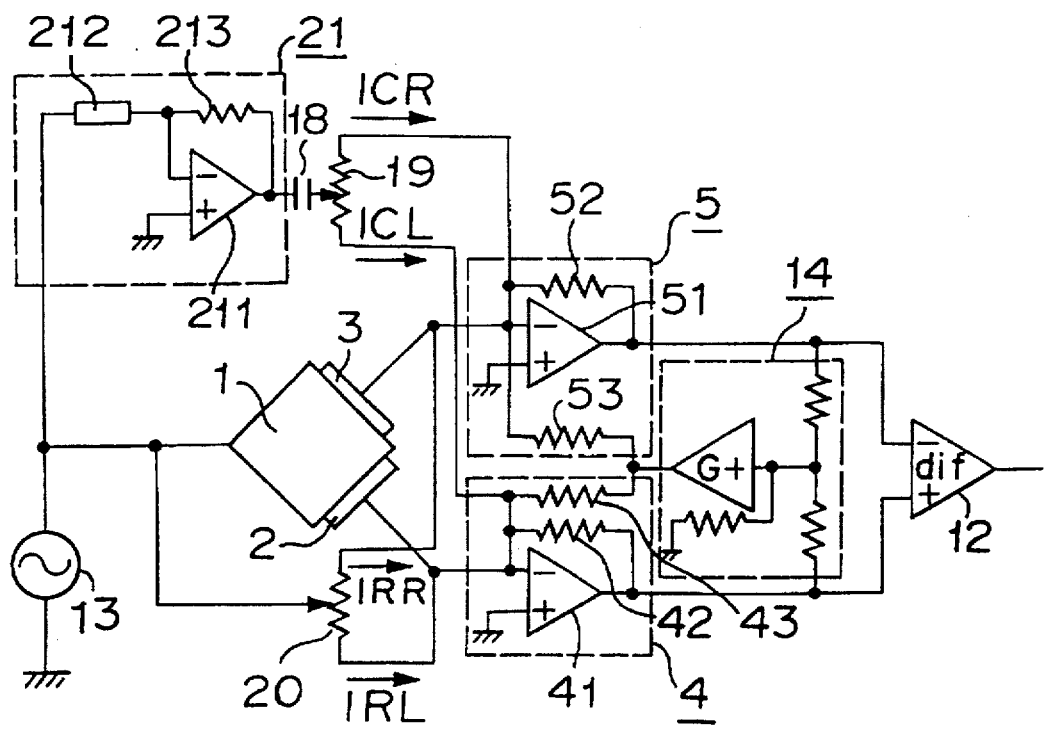
FIG. 11 is a construction diagram showing embodiment 6.

FIG. 11 shows the construction of Embodiment 6. Numeral 21 designates an inverting amplifier as an amplifying means, wherein numeral 211 designates an operational amplifier. numeral 212 designates a temperature detecting element as a temperature detecting mean of which resistance value changes by an environmental temperature, for instance, as in a thermistor, and numeral 213 designates a feedback resistor of the operational amplifier 211.

When the resistance value of the temperature detecting element 212 at an arbitrary temperature is defined as RT(T), the resistance value of the resistor 213, as RY, the amplification factor GC of the inverting amplifier 21 is provided as follows.

$$GC(T) = RY/RT(T) \qquad (62)$$

The equation (62) is substituted to the equation (55) as follows.

$$IL + IR + \frac{V}{RR \times KR \times (1-KR)} \times \sin(\omega \times t) - \qquad (63)$$

$$\frac{RY}{RT(T)} \times YX \times V \times \cos(\omega \times t)$$

The third term of equation (63) can be disregarded by rendering the resistance value RR of adjustable resistor 20 sufficiently large in comparison with the resistance components of the piezoelectric units 2 and 3. By comparing the equation (61) with the equation (63), the following equation is established.

$$Y0=\{RY/RT(T0)\}\times YX \quad (64)$$

Further, the following equation is established from the temperature coefficient of 0.3%/°C.

$$0.003=(d/dT)\times GC(T) \quad (65)$$

Therefore, the resistance value RY of the resistor 213, and the resistance value and the temperature characteristic of the temperature detecting element 212 are determined so that equations (64) and (65) are satisfied. In other words, the amplification factor GC of the inverting amplifier 21 is determined by the following equations.

$$GC(T)=GC(T0)\times\{1+0.003(T-T0)\} \quad (66)$$

As stated above, even if the damping capacitance components of the piezoelectric units 2 and 3 change with a change in an environmental temperature, the output signal of the adder 14 changes in accordance thereto. Therefore, the output signal of the adder 14 is always the sum of the current IL and the current IR subtracted by the damping capacitance components. In this way, even if an environmental temperature changes, the effect of Embodiment 1, that is, the improvement in the S/N ratio is always provided.

The above explanation has been given of the influence of the inverting amplifier 21 on the adder 14. Now, an explanation will be given of an influence of the inverting amplifier 21 on the differential amplifier 12 as follows.

It has been explained in Embodiment 5 that the error of the output signal of the operating amplifier 12 caused by the differences between the resistance components and between the reactance components of the piezoelectric units 2 and 3, can be eliminated. However, since the admittance of the damping capacitance has a temperature characteristic, even if the admittance is adjusted at a certain temperature, a signal of the angular velocity may be outputted irrespective of a nonrotational state, when the environmental temperature changes.

The inverting amplifier 21 operates to eliminate the error due to the difference between the reactance components, which is a component of the error of the output signal from the operating amplifier 21 which is caused by the temperature change. An explanation will be given of the operation as follows. Further, the method of eliminating an error due caused by the difference between the resistance components will be explained in a later embodiment.

The difference between the currents flowing in the piezoelectric units 2 and 3 is as follows in case wherein the angular velocity is not applied on the oscillator.

$$IL(T)-IR(T)=\Delta YX(T)\times V+\Delta YR(T)\times V \quad (67)$$

This equation (67) is derived by considering a condition in which the angular velocity is not applied on the oscillator in the case of the equation (48). The reason of eliminating $\Delta YX(T)$ in the equation (67) will be explained as follows.

As explained in Embodiment 5, the adjustable resistor 19 is adjusted so that the error caused by the difference between the reactance components of the piezoelectric units 2 and 3 at a certain environmental temperature T0. Accordingly, $\Delta YX$ in the equation (48) is adjusted so that the equation (54) is established at the environmental temperature T0, which is expressed as follows.

$$\Delta YX(T0)=(1-2\times KC)\times GC(T0)\times YX \quad (68)$$

In the meantime, $\Delta YX$ at an arbitrary environmental temperature T is expressed as follows.

$$\Delta YX(T)=\Delta YX(T0)\times\{1+0.003\times(T-T0)\} \quad (69)$$

Further, the amplification factor of the inverting amplifier 21 is adjusted so that the equation (66) is established.

Accordingly, the following equation is established from the equations (66), (68) and (69).

$$\Delta YX(T)=GC(T)\times YX \quad (70)$$

Therefore, $\Delta YX(T)$ can be eliminated by the inverting amplifier 21 at an arbitrary environmental temperature T. That is, the error of the output signal of the differential amplifier 21 caused by the difference between the reactance components of the piezoelectric units 2 and 3, can be eliminated.

Further, the above explanation has been given in this embodiment in which a thermistor is exemplified for the temperature detecting element, as an element having a negative temperature coefficient whereby the resistance value is decreased with an increase in the temperature. However, an element having a positive temperature coefficient whereby the resistance value increases with an increase in the temperature, for instance, a platinum temperature measuring element may be employed.

Figure 12:
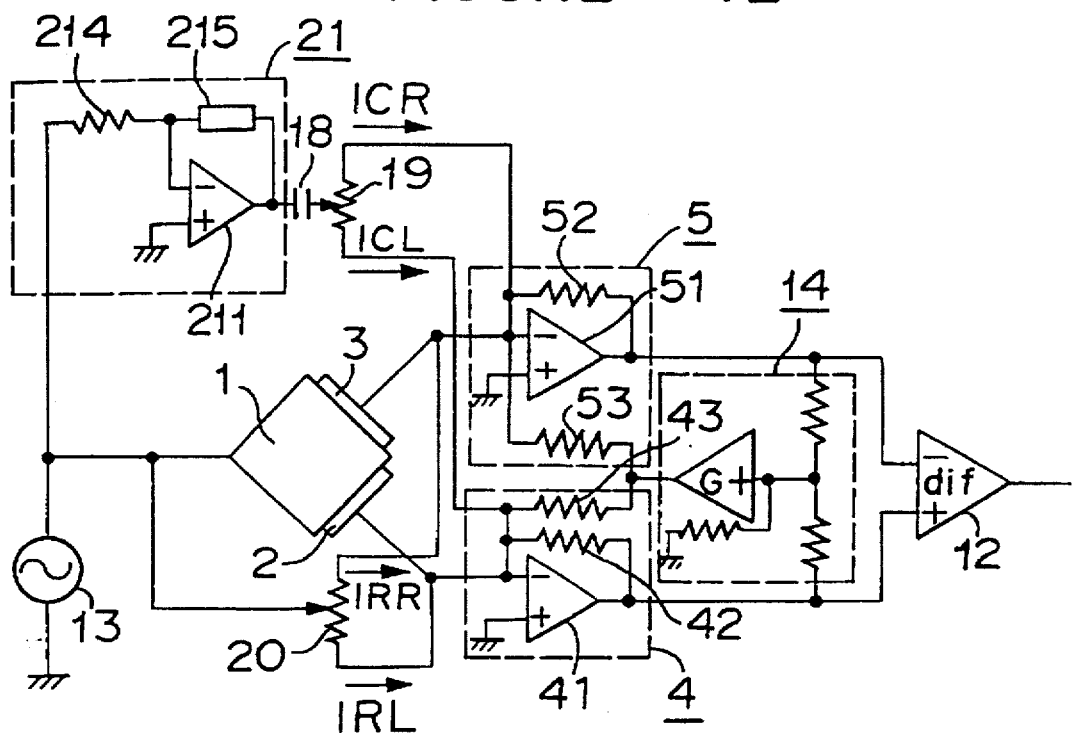
FIG. 12 is a construction diagram showing another construction of the embodiment 6.

In that case, the resistor 214 and the platinum temperature measuring element 215 may be connected as shown in FIG. 12 wherein the resistor is switched by the temperature detecting element.

EMBODIMENT 7

In Embodiment 6, the error caused by the difference between the reactance components of the piezoelectric units 2 and 3 is not generated even when the environmental temperature varies. However, it is not possible to eliminate an error caused by the difference between the resistance components of the piezoelectric units 2 and 3 as mentioned above.

Embodiment 7 eliminates the error of the output signal of the differential amplifier 12 caused by the difference between the resistance components of the piezoelectric units 2 and 3, which does not correspond only to the variation in the environmental temperature, but eliminates all the error of the output signal of the differential amplifier 12 caused by the difference between the resistance components, irrespective of any cause.

First, a simple explanation will be given of the technological thought of Embodiment 7.

The phase of the signal of the angular velocity which is outputted to the differential amplifier 12 is deviated by 90° with respect to the signal for driving the piezoelectric units 2 and 3, as mentioned above. On the other hand, the phase of the output signal of the differential amplifier 12 caused by the difference between the resistance components of the piezoelectric units 2 and 3 agrees with that of the signal for driving the piezoelectric units 2 and 3.

Accordingly, the error caused by the difference between the resistance components can be eliminated by separating it from the signal of the angular velocity having the phase difference of 90° based on this phase information.

Figure 13:
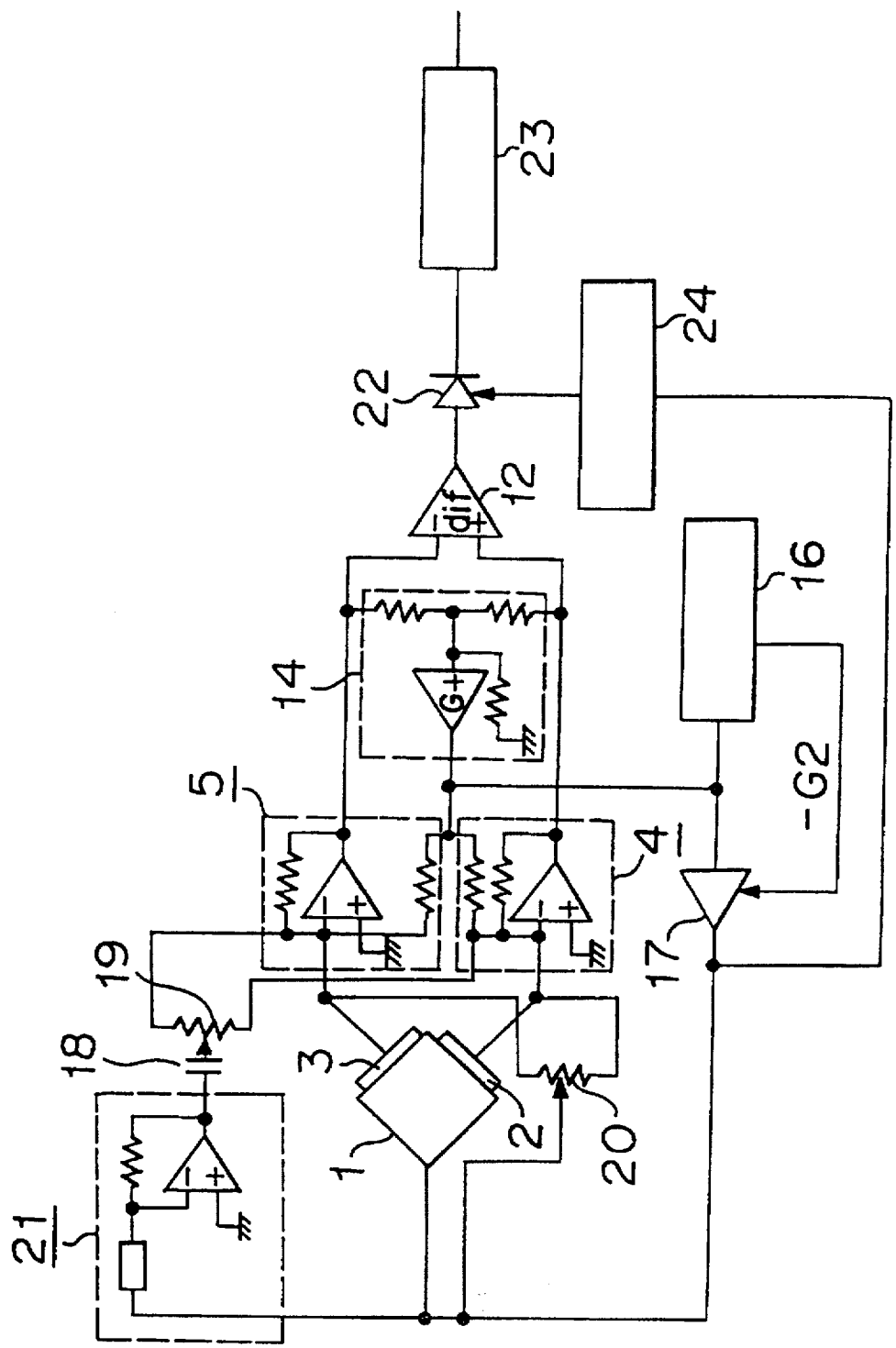
FIG. 13 is a construction diagram showing embodiment 7.

FIG. 13 shows the construction of Embodiment 7. Numeral 22 designates a synchronism detecting means which is connected to the output of the differential amplifier 12, and numeral 23 designates a low-pass filter which is connected to the output of the synchronism detecting means 22 and which eliminates high frequency components of the output signal of the synchronism detecting means 22. Numeral 24 designates a Synchronism sampling means for forming a synchronism signal that is given to the synchronism detecting means, which controls the operation of the synchronism detecting means.

Figures 14A, 14B, 14C:
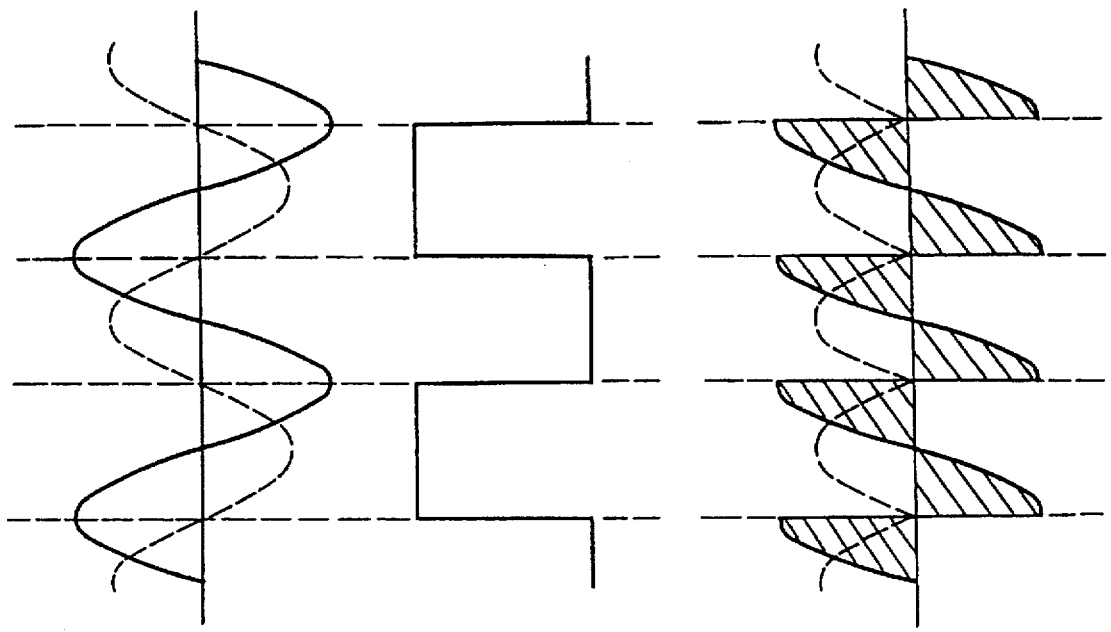
FIGS. 14a, 14b and 14c are time charts showing the operation of the embodiment 7.

Next, an explanation will be given of the operation of Embodiment 7 by using FIGS. 13, 14a, 14b and 14c. FIGS. 14a, 14b and 14c illustrate time charts showing the operation of Embodiment 7.

FIG. 14a shows the output signal of the differential amplifier 12 which is separated based on the phase information. In FIG. 14a, the bold line indicates a signal (the phase difference with respect to the signal for driving the piezoelectric units is 0°) caused by the difference between the resistance components of the piezoelectric units 2 and 3, and the broken line indicates a signal (the phase difference with respect to the signal for driving the piezoelectric units is 90°) in which a signal caused by the difference between the reactance components of the piezoelectric units 2 and 3 and the signal of the angular velocity are superposed.

The synchronism sampling means 24 forms the synchronism signal as in FIG. 14b based on the output signal of the amplifier 17, of which phase is the same as the signal for driving the piezoelectric units, that is, a signal having a phase the same as the signal caused by the difference between the resistance components as shown in FIG. 14a. This synchronism signal is given two values of H/L signals which are reverted at every peak of the signal caused by the difference between the resistance components as shown in FIG. 14b.

On the other hand, the synchronism detecting means 22 detects the output signal of the differential amplifier 12 by receiving the synchronism signal from the synchronism sampling means 24, which specifically operates as an inverting amplifier having the amplification factor of 1 when the output signal of the synchronism sampling means 24 is the H-level signal, and operates as a non-inverting amplifier having the amplification factor of 1 when the output signal of the synchronism sampling means 24 is the L-level signal.

Accordingly, the output signal of the differential amplifier 12 is detected to produce a signal in FIG. 14c by the synchronism detecting means 22. Therefore, the signal caused by the difference between the resistance components is cancelled since the positive and the negative areas at the hatching portions in FIG. 14c are equal to each other, and therefore, is not outputted.

In this way, the accuracy of the oscillation gyro can be promoted by eliminating the error of the output signal of the differential amplifier 12 caused by the difference between the resistance components of the piezoelectric units 2 and 3.

The low-pass filter 23 receives the output signal of the synchronism detecting means 22 as in FIG. 14c, and outputs it after eliminating high frequency components.

Further, although embodiment 7 can not eliminate the error caused by the difference between the reactance components that is superposed on the broken line of FIG. 14a, this operation can be performed by the aforementioned embodiment.

EMBODIMENT 8

The explanation has been given to Embodiment 7 in which the phase of the output signal of the amplifier 17 agrees with that of the signal for driving the piezoelectric units 2 and 3. However, there is a case wherein the both phases do not agree with each other as in the above Embodiment 4. Embodiment 8 shows an example corresponding to such a case.

Figure 15:
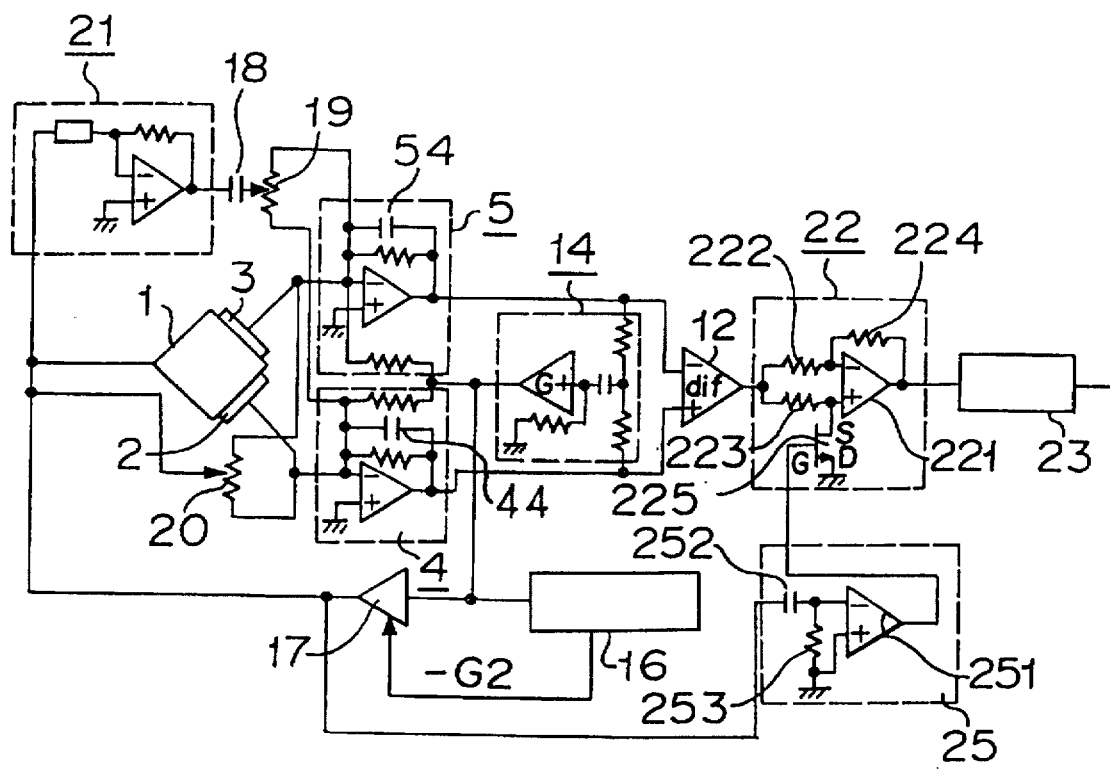
FIG. 15 is a construction diagram showing embodiment 8.

FIG. 15 shows the construction of Embodiment 8. In FIG. 15, the synchronism detecting means 22 is shown in details. Numeral 221 designates an operational amplifier. The two input terminals of the operational amplifier 221 are respectively connected with ends of the resistors 222 and 223, and the other ends of the resistors 222 and 223 are connected to the output end of the differential amplifier 12. A feedback resistor 224 is connected between the inverting input terminal of the operational amplifier 221 and the output terminal thereof. Further, an S (source) terminal of an FET225 is connected to the non-inverting input terminal of the operational amplifier 221. The D (drain) terminal of the FET225 is grounded, and the G (gate) terminal is connected to the output of the synchronism sampling means 25.

Numeral 25 designates a synchronism sampling means for outputting a synchronism signal to the FET225 of the synchronism detecting means 22, which is composed of an operational amplifier 251 the output terminal of which is connected to the G terminal of the FET225 and the non-inverting terminal of which is grounded, a condenser 252 of which one terminal is connected to the inverting input terminal of the operational amplifier 251 and the other terminal of which is connected to the output terminal of the amplifier 17, and a resistor 253 one terminal of which is connected to the inverting input terminal of the operational amplifier 251 and the other terminal of which is grounded. Further, the operational amplifier 251 constitutes a comparing mean, and the condenser 252 and the resistor 253 constitute a phase advancing means comprising a differentiating circuit.

Next, an explanation will be given of the operation of Embodiment 8 by using FIGS. 15, 16a, 16b, 16c and 16d. FIGS. 16a, 16b, 16c and 16d illustrate time charts showing the operation of Embodiment 8.

Figures 16A, 16B, 16C, 16D:
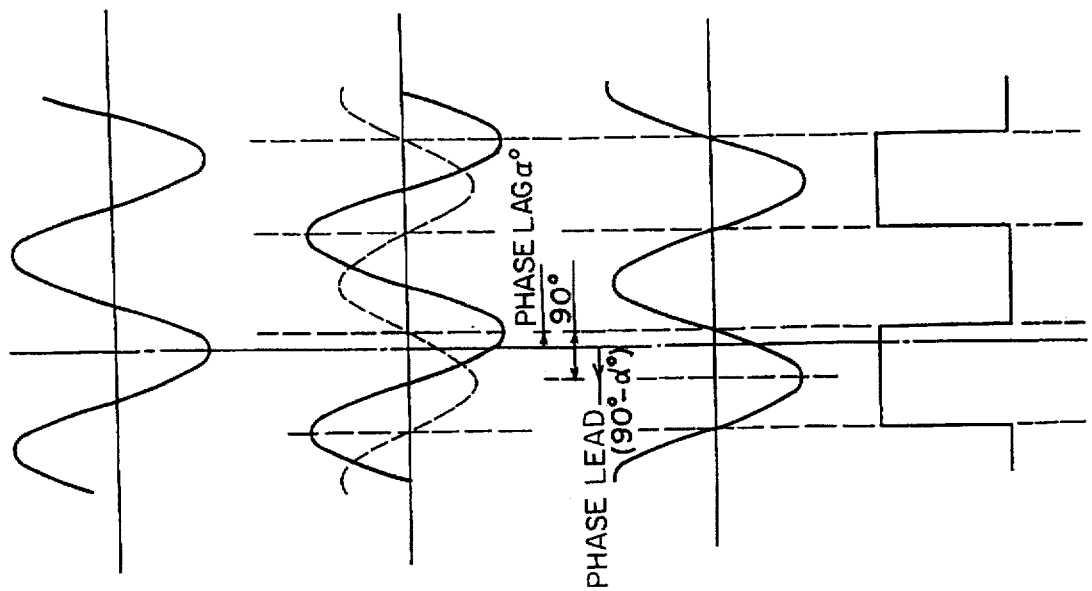
FIGS. 16a, 16b, 16c and 16d are time charts showing the operation of the embodiment 8.

FIG. 16a shows an output signal of the amplifier 17. In FIG. 16b, the output signal of the differential amplifier 12 is separated based on the phase information. The bold line corresponds to a signal due to the difference between the resistance components of the piezoelectric units 2 and 3 which has been shown in Embodiment 7, of which phase is retarded by $\alpha°$ with respect to the output signal of the amplifier 17 by the condensers 44 and 54 installed at the current-voltage converters 4 and 5. Similarly, the broken line corresponds to a signal in which the signal caused by the difference between the reactance components and the signal of the angular velocity are superposed as shown in Embodiment 7, of which phase is also retarded by $\alpha°$.

Now, to remove the signal caused by the difference between the resistance components from the output signal of the differential amplifier 12, a synchronism signal in synchronism with that signal should be formed.

The phase of the signal caused by the difference between the resistance components is retarded with respect to the phase of the output signal of the amplifier 17 by $\alpha°$. Therefore, to form the synchronism signal based on the output of the signal amplifier 17, the phase of the output signal of the amplifier 17 should be advanced by (90-$\alpha$)° and a comparison should be made by a zero-cross comparator. The phase lag $\alpha°$ by the current-voltage converters 4 and 5 can previously be provided by calculation based on the capacitances of the condensers 44 and 54 which are installed in the current-voltage converters.

Accordingly, a differential circuit which advances the phase of the output signal of the amplifier 17 by (90-$\alpha$)° and a zero-close comparator should be installed to the synchronism sampling means 25.

FIG. 16c shows an output signal from the differentiating circuit comprising the condenser 252 and the resistor 253, the phase of which is advanced by (90-$\alpha$)° with respect to the output signal of the amplifier 17. This signal is compared with the ground potential by the operational amplifier 251, and is outputted as the synchronism signal of two values of H/L signals shown in FIG. 16d.

The synchronism signal is outputted to the G terminal of the FET225 of the synchronism detecting means 22 and has the synchronism detecting means 22 operate as an inverting amplifier or a non-inverting amplifier having the amplification factor of 1 by rendering the FET22 conductive or nonconductive.

That is, when the FET225 is nonconductive, no current flows in the FET225. Therefore, the output signal of the differential amplifier 12 is inputted to the non-inverting input terminal of the operational amplifier 221 as it is. Thereby, the syhchronism detecting means 22 becomes a non-inverting amplifier having the amplification factor of 1 and the output signal of the differential amplifier 12 is outputted as it is. Conversely, when the FET225 is conductive, the non-inverting input terminal of the operational amplifier 221 is grounded. Since the resistance values of the resistors 222 and 223 are the same, at this moment, the synchronism detecting means 22 becomes an inverting amplifier having the amplification factor of 1.

The signal caused by the difference between the resistance components is eliminated by having the synchronism detecting means 22 operate as an inverting amplifier or a non-inverting amplifier as in Embodiment 7 and the explanation will be omitted.

Further, in Embodiment 8, the signal for driving the piezoelectric units is advanced by $(90-\alpha)°$. However, this invention is not restricted to this example and in short, the signal for driving the piezoelectric units should be in synchronism with a signal having the phase lag of $\alpha°$.

EMBODIMENT 9

Embodiment 9 provides another method of solving which is different from that of Embodiment 8.

That is, specifically, in Embodiment 8, the synchronism signal is formed by using the output signal per se of the piezoelectric unit driving mean. Embodiment 9 is different from Embodiment 8 in the point in which the synchronism signal is formed by using a signal based on the output signal of the piezoelectric unit driving mean (signal which deviates the phase of the output signal of the piezoelectric unit driving means, for instance, the output signal of the current-voltage converter in case wherein a condenser is installed in the current-voltage converter, etc.).

Figure 17:
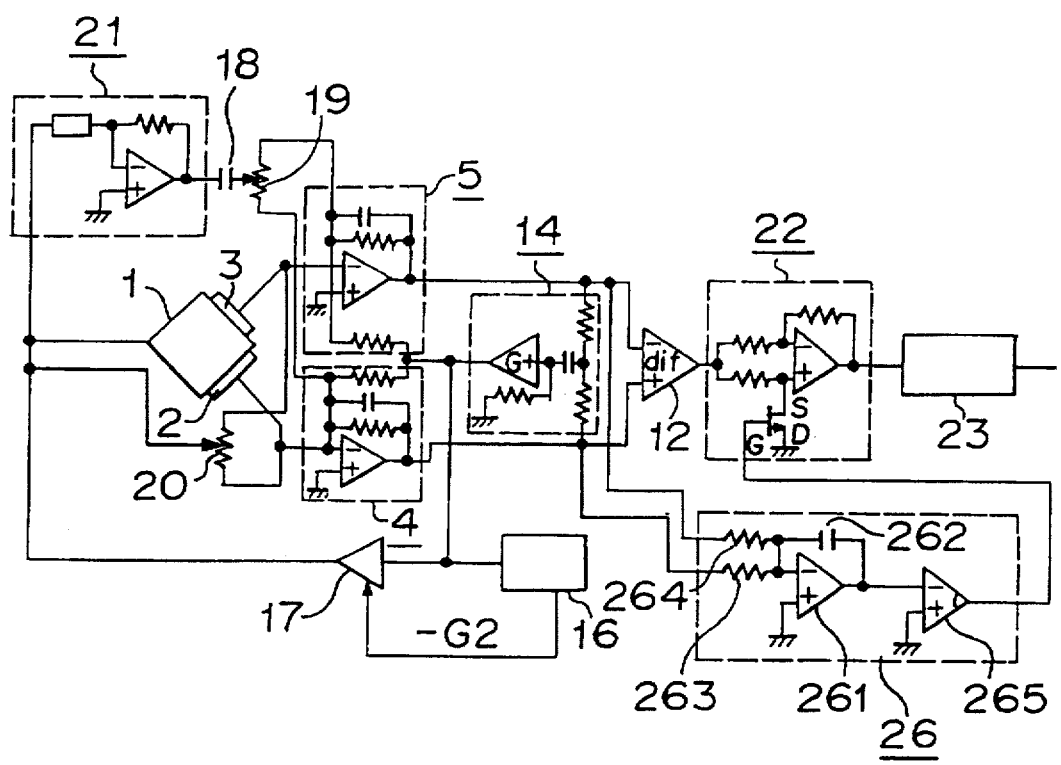
FIG. 17 is a construction diagram showing embodiment 9.

FIG. 17 shows the construction of Embodiment 9. The embodiment of FIG. 17 is different from Embodiment 8 in the construction of a synchronism sampling means 26 and the point that the input signal to the synchronism sampling means 26 is the output signals from the current-voltage converters 4 and 5. Numeral 261 designates an operational amplifier the non-inverting input terminal of which is grounded, numeral 262 designates a condenser connected between the inverting input terminal and the output terminal of the operational amplifier 261, numerals 263 and 264 designate resistors ends of which are connected to the inverting input terminal and the other ends of which are respectively connected to the output terminals of the current-voltage converters 4 and 5. In this circuit, the operational amplifier 261, the condenser 262 and the resistors 263 and 264 constitute an integrating circuit which is a phase shifting means. A numeral 265 designates an operational amplifier as a comparing means, of which its inverting input terminal is connected to the output terminal of the operational amplifier 262 and the output terminal of which is connected to the synchronism detecting means 22, respectively, and the non-inverting input terminal thereof is grounded.

An explanation will be given of forming a synchronism signal in Embodiment 9 by using FIGS. 17, 18a, 18b, 18c and 18d. After the synchronism signal is formed, the operation is the same as in the above example and the explanation will be omitted.

Figures 18A, 18B, 18C, 18D:
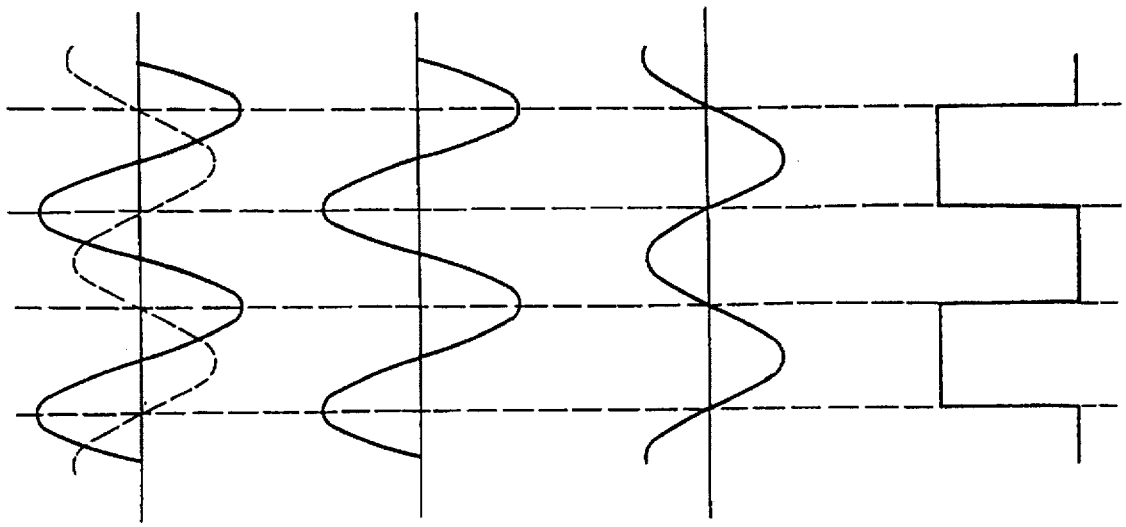
FIGS. 18a, 18b, 18c and 18d are time charts showing the operation of the embodiment 9.

FIGS. 18a, 18b, 18c and 18d illustrate time charts showing the operation of Embodiment 9. In FIG. 18a, the output signal from the differential amplifier 12 is separated based on the phase information, and the separated signals correspond to the signal caused by the difference between the resistance components and the reactance components as mentioned above.

The integrating circuit of synchronism detecting means 26 has a construction of adding the output signal from the current-voltage converters 4 and 5 and integrating the added signal. FIG. 18b shows a signal having a value corresponding to the added outputs from the current-voltage converters 4 and 5. The phase of this signal is the same with that of the output signal of the differential amplifier 12.

Now, it is generally known that an integrating circuit outputs a signal the phase of which is retarded by 90° with respect to the phase of an inputted signal. Accordingly, as shown in FIG. 18c, the output signal of the integrating circuit has a phase difference of 90° with respect to the signal caused by the difference between the resistance components.

The operational amplifier 261 forms a synchronism signal having two values of H/L signals by comparing the output signal of the integrating circuit with the ground potential as shown in FIG. 18d.

According to Embodiment 9, it is possible to make the synchronism signal in synchronism with the signal caused by the difference between the resistance components irrespective of whether the condensers 44 and 55 are installed or not.

The reason is that the condensers 44 and 54 retard the phase of the output signals from the current-voltage converters 4 and 5.

By contrast, the phase of the output signal from the differential amplifier 12 agrees with the phase of the output signals from the current-voltage converters 4 and 5, and the phase of the output signal of the integrating circuit is retarded by 90° with respect to the phase of the output signals from the current-voltage converters 4 and 5.

Accordingly, since the both signals make reference to the phase of the output signals from the current-voltage converters 4 and 5, even if the reference is retarded by the condensers 44 and 54, the phase relationship between the both signals does not change.

Further, the amount of shift by the shifting means is not restricted to the phase lag of 90°, and may be a phase lead of 90°. In short, it is significant to shift the outputs of the current-voltage converters 4 and 5 so that they are in synchronism with the signal caused by the difference between the resistance components.

EMBODIMENT 10

Embodiment 10 prevents an oscillation gyro from not showing an output of a correct angular velocity by being resonated.

First, an explanation will be given of the reason of resonating an oscillation gyro.

The oscillator 1 is oscillated in the driving-axis direction at the resonance frequency. The speed vY of the oscillation is expressed by the following equation.

$$vY = vY \times \sin(\omega Y \times t) \tag{71}$$

Now, an angular velocity $\Omega$ is applied as in the following equation.

$$\omega = \Omega \times \cos(\omega \times t) \tag{72}$$

The balance of forces in the detecting-axis direction is provided by substituting equations (71) and (72) to equation (8), as follows.

$$0 = 2 \times m \times \Omega \times vY \times \sin(\omega Y \times t) \times \cos(\omega \times t) - ZX \times vX \quad (73)$$

Equation (74) is provided by modifying equation (73) as follows.

$$0 = m \times \Omega \times [\sin\{(\omega Y + \omega) \times t\} + \sin\{(\omega Y - \omega) \times t\}] - ZX \times vX \quad (74)$$

Equation (74) is rearranged with respect to the oscillation speed vX in the detecting-axis direction, as follows.

$$vX = \frac{m \times \Omega \times [\sin\{(\omega Y + \omega) \times t\} + \sin\{(\omega Y - \omega) \times t\}]}{ZX} \quad (75)$$

As is known from equation (75), when the sum of or the difference between the resonance frequency ωY in driving-axis direction of the oscillator 1 and the frequency ω of change of the angular velocity Ω agrees with the resonance frequency in the detecting-axis direction of the oscillator 1, the oscillator 1 is resonated in the detecting-axis direction by the Coriolis force caused by the angular velocity.

Figure 19:
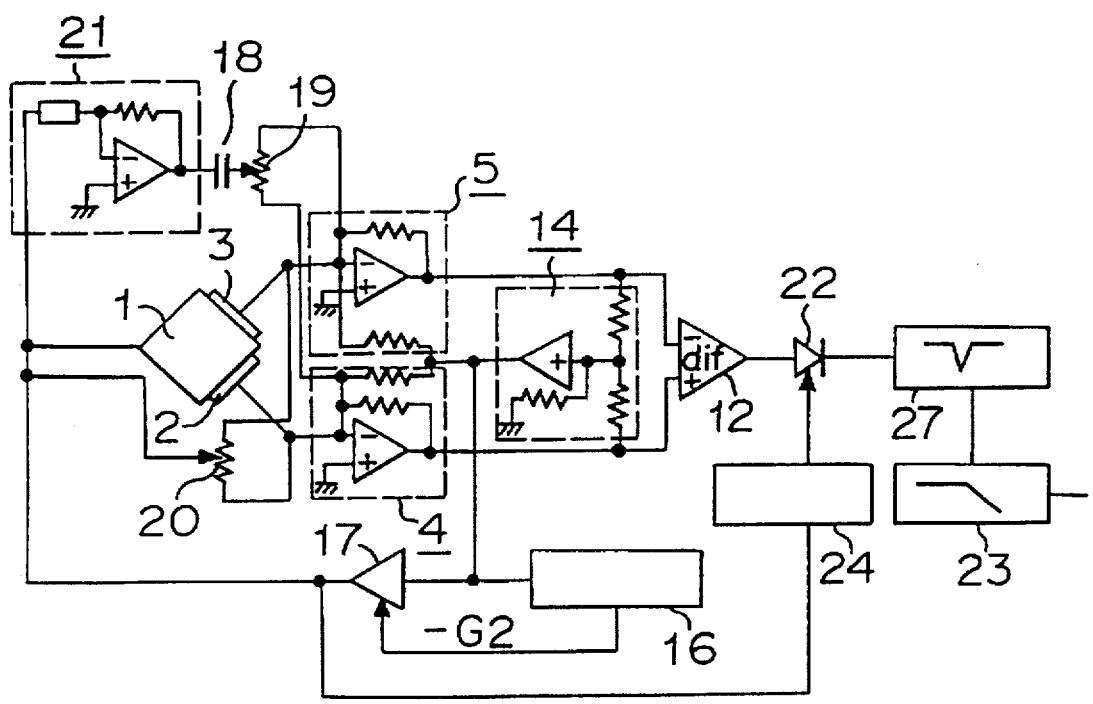
FIG. 19 is a construction diagram showing embodiment 10.
Figure 20:
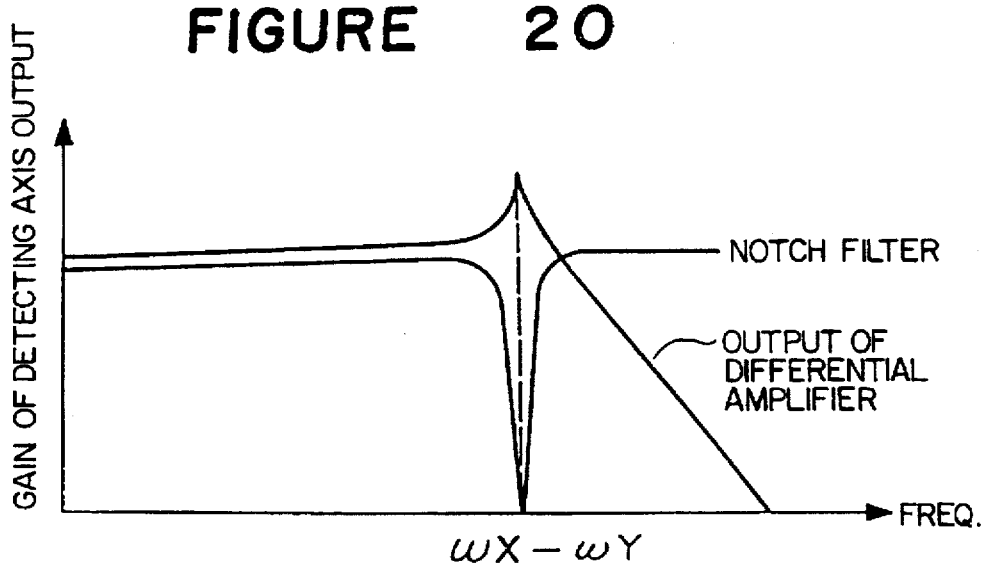
FIG. 20 is a characteristic diagram showing an example of a characteristic of a notch filter.

FIG. 19 shows the construction of Embodiment 10. In FIG. 19, in comparison with FIG. 13, a notch filter 27 is provided between the synchronism detecting means 22 and the low-pass filter 23, which is a filter means. FIG. 20 shows an example of the characteristic of the notch filter 27. According to FIG. 20, the notch frequency of the notch filter 27 is set at a frequency which is approximately equal to a difference between the resonance frequency ωY in the driving-axis direction and the resonance frequency ωX in the detecting-axis direction.

Accordingly, even if the oscillator 1 is resonated in the detecting-axis direction at the resonance frequency, the output signal caused by the resonance is removed by the notch filter 27 and is not present in the output signal of the angular velocity.

EMBODIMENT 11

Embodiment 11 is concerned with an inspection apparatus for inspecting a characteristic of an oscillating unit comprising the oscillator 1 and the piezoelectric units 2 and 3. It is possible to know whether the characteristic can be compensated by the above embodiments or the like by previously inspecting the characteristic of the oscillating unit, without integrating an oscillation gyro, thereby improving the yield of product of the oscillation gyro.

Figure 21:
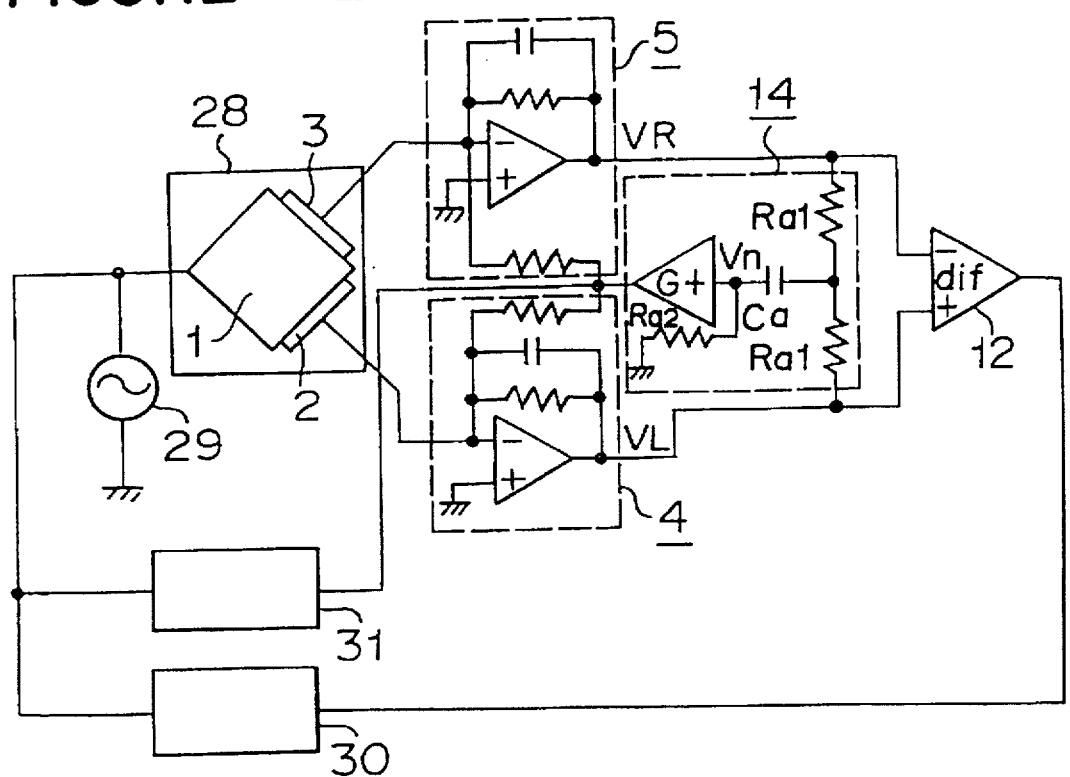
FIG. 21 is a construction diagram showing embodiment 11.

FIG. 21 shows the construction of Embodiment 11. The oscillator 1 and the piezoelectric units 2 and 3 constitute the oscillation unit which is the object of inspection. The oscillating unit is electrically connected to a surrounding circuit and is attached to a holding member 28 which is a holding means for attachably and detachably holding the oscillating unit. Numeral 29 designates a voltage source for supplying electric power to the oscillating unit, which not only supplies the resonance frequency in the driving-axis direction of the oscillator 1, but a signal having an arbitrary frequency including the resonance frequency. Numeral 30 designates a differential output inspecting means which is an error calculation output inspecting means, and which calculates a transfer function from the output of the voltage source 29 up to the output of the differential amplifier 12. Numeral 31, designates an added output inspecting means, which calculates a transfer function from the output of the voltage source 29 up to the output of the adder 14.

Figure 22:
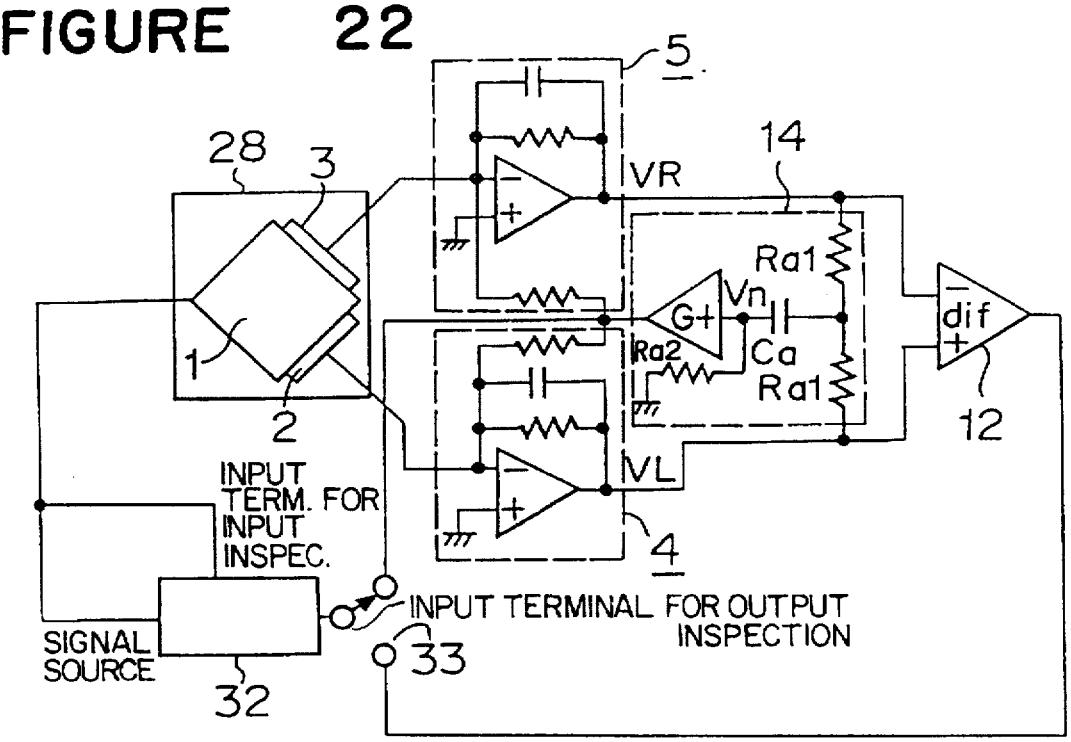
FIG. 22 is a construction diagram in case wherein an FFT analyzer is used in the embodiment 11.

FIG. 22 shows an example wherein the voltage source 29, the differential output inspecting means 30 and the added output inspecting means 31 are composed by an FFT analyzer 32. Normally, an FFT analyzer is attached with a signal source which is employed as the voltage source 29. As is generally known, an FFT analyzer is provided with two input terminals, one of which is an input terminal for input inspection, the other one of which is an input terminal for output inspection, and which is a measuring instrument for measuring a transfer function from signals inputted to these input terminals by way of fast Fourier transform algorithm.

Figure 23:
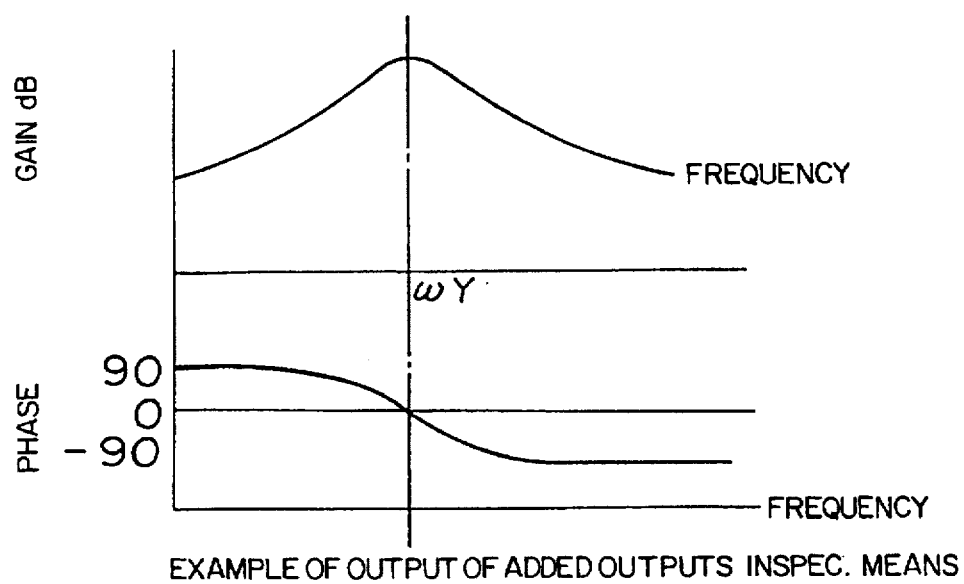
FIGS. 23a and 23b are characteristic diagrams of transfer functions which are provided by the FFT analyzer.
Figure 23:
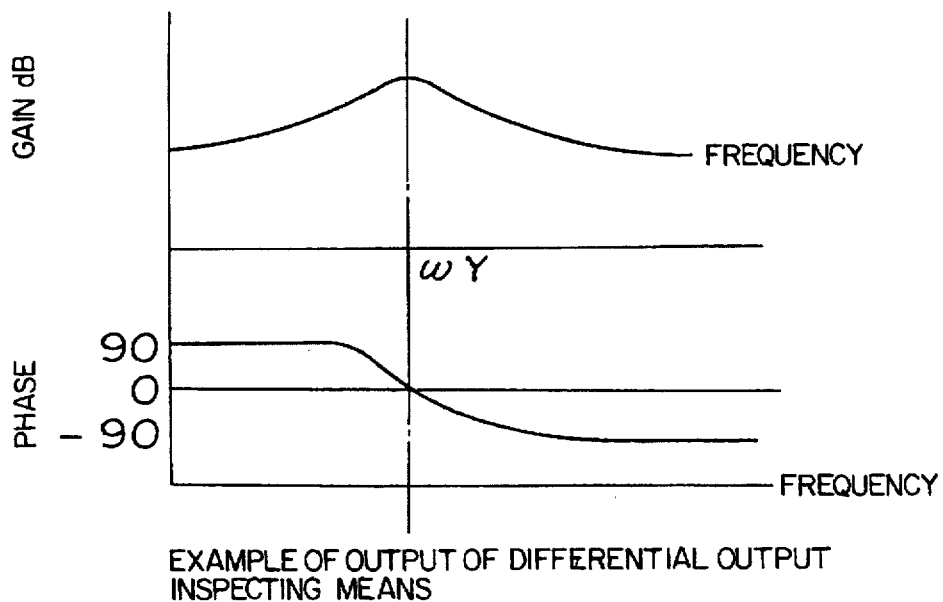

The signal source of the FFT analyzer 32 is connected to the input terminal for input inspection as well as the oscillator 1. On the other hand, the input terminal for output inspection is connected to a switching device 33 of which one terminal is connected to the output of the adder 14 and the other terminal of which is connected to the output of the differential amplifier 12. By switching the switching device 33, inspection results of FIGS. 23a or 23b are provided.

An explanation will be given of the operation of Embodiment 11.

The invented oscillation gyro is oscillated in a self-excited oscillation at-the resonance frequency in the driving-axis direction of the oscillator 1. When the oscillator 1 is resonated in the driving-axis direction, the resistance components of the piezoelectric units 2 and 3 are minimized at the resonance point. Accordingly, the frequency in which the real number part of a transfer function in a measurement which is carried out by connecting the input terminal for output inspection to the output of the adder 14, becomes a maximum value, is the resonance frequency in the driving-axis direction of the oscillator 1. Therefore, a value of the transfer function at the resonance frequency which is provided by connecting the input terminal for output inspection to the output of the differential amplifier 12 reflects the difference between the resistance components or the difference between the reactance components of the piezoelectric units 2 and 3.

That is, when the amplitude ratio of the transfer function at the resonance frequency is defined as G, and the phase thereof, as P, the difference between the resistance components and the difference between the reactance components are provided by the following equations.

Difference between resistance components:

$$\Delta R = G \times \sin P \quad (76)$$

Difference between reactance components:

$$\Delta X = G \times \cos P \quad (77)$$

A specific explanation will be given of the operation by using FIGS. 23a and 23b.

First, the switching device 33 is switched to the output side of the adder 14. A voltage having an arbitrary frequency is outputted from the signal source of the FFT analyzer 32, and the output of the adder 14 in correspondence to the voltage is outputted to the input terminal for output inspection. As a result, characteristic diagrams as in FIG. 23a are provided. Next, the switching device 33 is switched to the output side of the differential amplifier 12. Similarly, a voltage having an arbitrary frequency is outputted from the signal source of the FFT analyzer 32, and the output of the differential amplifier 12 in correspondence to the voltage is outputted to the input terminal for output inspection. As a result, characteristic diagrams as in FIG. 23b are provided.

The resonance frequency in the driving-axis direction of the oscillator 1 is known from FIG. 23a. Further, G and P at the resonance frequency in the driving-axis direction of the oscillator 1 is known from FIG. 23b. The difference between the resistance components and the difference between the reactance components of the piezoelectric units 2 and 3 are known from equations (76) and (77).

Further, in case wherein low-pass filters are attached to the current-voltage converters 4 and 5, or a low-pass filter is attached to the differential amplifier 12 whereby the phase is changed, the difference between the resistance components or the reactance components can be measured with no problem by subtracting the phase measuring these phase lags from P.

Further, in case wherein the difference between the reactance components should be measured more accurately, the aforementioned adjustable resistor 20 is added to the illustrated and explained inspection apparatus, which is adjusted to minimize the output of the differential amplifier 12 caused by the difference between the resistance components.

EMBODIMENT 12

Figure 24:
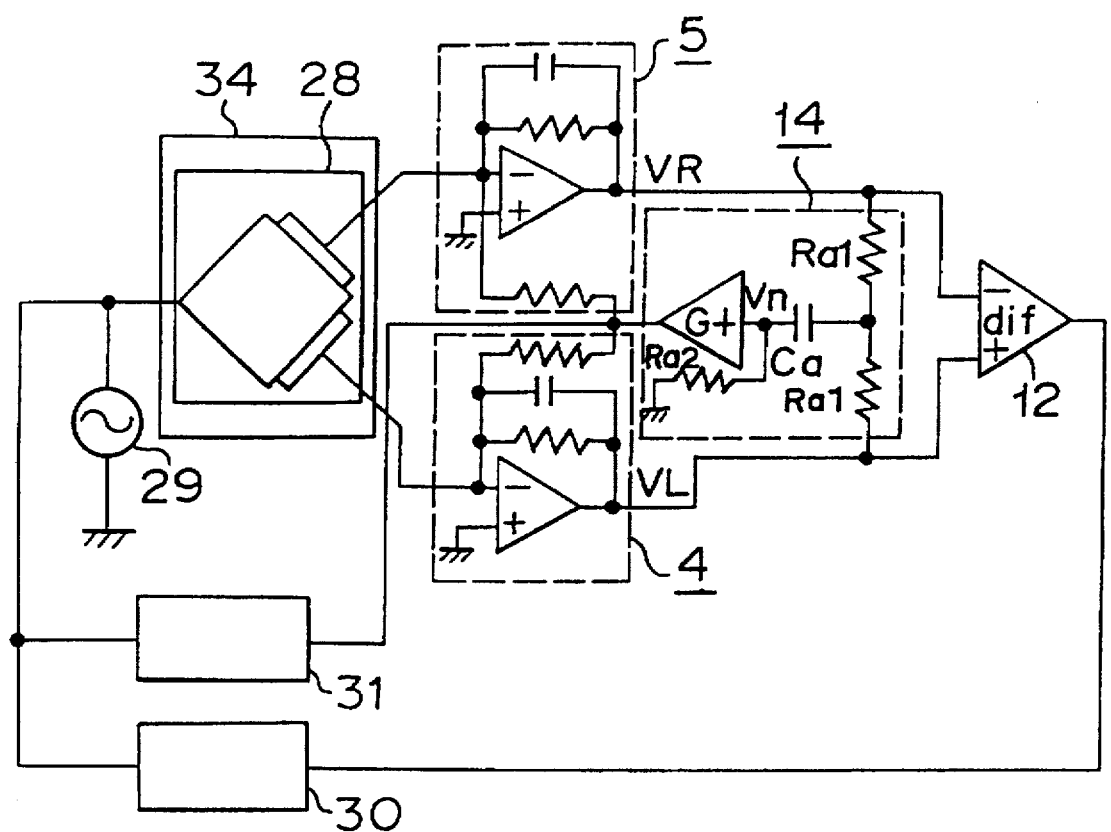
FIG. 24 is a construction diagram showing embodiment 12.

FIG. 24 shows the construction of Embodiment 12, wherein a thermostatic chamber 34 that is a temperature control means is added to the construction of FIG. 21. As is generally known, the thermostatic chamber can set temperature or humidity inside the chamber at an arbitrary value.

Accordingly, the difference between the resistance components and the difference between the reactance components of the piezoelectric units 2 and 3 can be measured at an arbitrary temperature.

This invention achieves the following effects since it is constructed as explained above.

The output of the adding means is fed back respectively to the plurality of current-voltage converting means, whereby the gain of the current components caused by driving the oscillator can be lowered, whereby the S/N ratio of the current component caused by the angular velocity is improved.

Further, the adding means operates as the piezoelectric units driving means, whereby the circuit is simplified.

Further, the amplitude of the output of the adding means is controlled to a predetermined value, whereby the gain of the vibration gyro is stabilized.

Further, the low-pass filters are installed to the current-voltage converting means, whereby the current-voltage converting means are stably operated.

Further, the shunt amounts are controlled by the first and the second shunt amount controlling means, whereby the error caused by the difference between the characteristics of the piezoelectric units is compensated.

Further, the amplification factor of the amplifier is changed by the detected output of the temperature detecting mean, whereby the error caused by the change in the environmental temperature of the piezoelectric units is compensated.

Further, the output of the error calculating means is detected based on the signal caused by the error of the resistance components, whereby the error of the output of the angular velocity caused by the difference between the resistances of the piezoelectric units is nullified.

Further, the synchronism sampling means is provided with the phase advancing means for advancing the output of the piezoelectric unit driving means, whereby the error of the output of the angular velocity caused by the difference between the resistance components of the piezoelectric units is nullified and the operation of the oscillation gyro is stabilized.

Further, the synchronism sampling means detects the output of the error calculating means based on the output of the current-voltage converting mean, whereby the error of the output of the angular velocity caused by the resistance components of the piezoelectric units is more firmly nullified.

Further, the filter means restrains the output of the error calculating means in the frequency domain in which the oscillator is resonated, whereby the oscillation gyro is prevented from outputting an abnormal signal.

Further, the inspection apparatus for an oscillation gyro according to the present invention can inspect only the oscillating unit by rendering the oscillating unit attachable and detachable, whereby the yield of product of the oscillation gyro is improved with no need of inspecting a finished product.

Further, the inspection apparatus inspects the temperature characteristic of the difference between the properties of the piezoelectric units by changing the environmental temperature of the oscillating unit by the temperature controlling mean.

What is claimed is:

1. A vibration gyro comprising:

an oscillator;

a plurality of piezoelectric units for oscillating the oscillator in a predetermined driving-axis direction;

piezoelectric unit driving means for driving the plurality of piezoelectric units by supplying an electric power to a common electrode of the plurality of piezoelectric units;

a plurality of current-voltage converting means each for converting a current outputted from each of noncommon electrodes of the plurality of piezoelectric units to a voltage;

eliminating means for eliminating damping components of the plurality of piezoelectric units by amplifying an output of the piezoelectric unit driving means by a predetermined amplification factor, shifting a phase of an amplified signal by a predetermined angle, shunting the amplified signal, and supplying each of shunted signals to each of the plurality of current-voltage converting means;

a first shunt amount controlling means for controlling amounts of the shunted signals;

a second shunt amount controlling means connected to an output terminal of the piezoelectric unit driving means for shunting an output from the piezoelectric unit driving means, supplying shunted outputs respectively to the plurality of current-voltage converting means, and controlling shunt amounts; and error calculating means for calculating a difference between outputs of the plurality of current-voltage converting means.

2. A vibration gyro comprising:

an oscillator;

a plurality of piezoelectric units for oscillating the oscillator in a predetermined driving-axis direction;

piezoelectric unit driving means for driving the plurality of piezoelectric units by supplying an electric power to a common electrode of the plurality of piezoelectric units;

a plurality of current-voltage converting means each for converting a current outputted from each of noncommon electrodes of the plurality of piezoelectric units to a voltage;

eliminating means for eliminating damping components of the plurality of piezoelectric units by amplifying an output of the piezoelectric unit driving means by a predetermined amplification factor, shifting a phase of an amplified signal by a predetermined angle, shunting the amplified signal, and supplying each of shunted signals to each of the plurality of current-voltage converting means;

error calculating means for calculating a difference between the outputs of the plurality of current-voltage converting means; and wherein the eliminating means includes temperature detecting means for detecting an environmental temperature and an amplifying means wherein said predetermined amplification factor is changed by the temperature detecting means.

3. A vibration gyro comprising:

an oscillator;

a plurality of piezoelectric units for oscillating the oscillator in a predetermined driving-axis direction;

piezoelectric unit driving means for driving the plurality of piezoelectric units by supplying an electric power to a common electrode of the plurality of piezoelectric units;

a plurality of current-voltage converting means each for converting a current outputted from each of noncommon electrodes of the plurality of piezoelectric units to a voltage;

eliminating means for eliminating damping components of the plurality of piezoelectric units by amplifying an output of the piezoelectric unit driving means by a predetermined amplification factor, shifting a phase of an amplified signal by a predetermined angle, shunting the amplified signal, and supplying each of shunted signals to each of the plurality of current-voltage converting means;

error calculating means for calculating a difference between the outputs of the plurality of current-voltage converting means;

filter means provided at an output side of the error calculating means for restraining an output in a predetermined frequency domain; and wherein the predetermined frequency domain is adjacent to a frequency approximately equal to a sum of or a difference between a first resonance frequency in a driving-axis direction of the oscillator and a second resonance frequency in a detecting-axis direction of the oscillator.

4. A vibration gyro comprising:

an oscillator;

a plurality of piezoelectric units for oscillating said oscillator in a predetermined driving-axis direction, each of the piezoelectric units having a common electrode in common with each of the other piezoelectric units, a noncommon electrode, and a resistive component;

piezoelectric unit driving means for driving said plurality of piezoelectric units by supplying an electric power signal to said common electrode of said plurality of piezoelectric units;

a plurality of current-voltage converting means each for converting a current output from the noncommon electrode of one of said plurality of piezoelectric units to a voltage and outputting said voltage as a converted signal;

eliminating means for eliminating damping components of the currents output from said plurality of piezoelectric units by amplifying by a predetermined amplification factor said electric power signal supplied from said piezoelectric unit driving means, altering by a predetermined angle a phase of the amplified electric power signal, dividing the amplified electric power signal having the altered phase, and supplying the divided signals to said plurality of current-voltage converting means;

error calculating means for calculating a difference between the outputs of said plurality of current-voltage converting means and outputting a signal representing said difference;

synchronism sampling means for outputting a synchronism signal in synchronism with a resistance error signal caused by an error due to said resistance components of said plurality of piezoelectric units based on the converted signals output from said plurality of current-voltage converting means, wherein the synchronism sampling means includes a phase advancing means for advancing a phase of an output of the piezoelectric unit driving means and is a comparing means for comparing an output of the phase advancing means with a reference value; and synchronism detecting means connected to said error calculating means for detecting said signal output from said error calculating means based on said synchronism signal and outputting a detected signal, wherein said detected signal indicates an angular velocity of the oscillator.

* * * * *